(12) United States Patent
Fiotakis

(10) Patent No.: US 6,261,142 B1
(45) Date of Patent: Jul. 17, 2001

(54) SUBMERSIBLE AND RETRIEVABLE BUOY

(75) Inventor: John Michael Fiotakis, Sandy Bay (AU)

(73) Assignee: Fiomarine Investments PTY Ltd. (AU)

( * ) Notice: Subject to any disclaimer, the term of this patent is extended or adjusted under 35 U.S.C. 154(b) by 0 days.

(21) Appl. No.: 09/402,304

(22) PCT Filed: Apr. 3, 1998

(86) PCT No.: PCT/AU98/00227

§ 371 Date: Nov. 30, 1999

§ 102(e) Date: Nov. 30, 1999

(87) PCT Pub. No.: WO98/45169

PCT Pub. Date: Oct. 15, 1998

(30) Foreign Application Priority Data

Apr. 3, 1997 (AU) ................................................ PO 5974

(51) Int. Cl.⁷ ........................................................ B63B 22/00
(52) U.S. Cl. ................................................ 441/11; 441/2
(58) Field of Search ............................... 441/2, 7, 10, 11, 441/33

(56) References Cited

U.S. PATENT DOCUMENTS

| 3,848,226 | 11/1974 | Perez | 340/5 |
|---|---|---|---|
| 4,136,415 | 1/1979 | Blockburger. | |
| 4,262,379 | 4/1981 | Jankiewicz | 441/2 |

FOREIGN PATENT DOCUMENTS

| 10911/95 | 5/1995 | (AU) . |
|---|---|---|
| 20074/95 | 12/1995 | (AU) . |

*Primary Examiner*—Jesus D. Sotelo
(74) *Attorney, Agent, or Firm*—Woodcock Washburn Kurtz Mackiewicz & Norris LLP

(57) ABSTRACT

Buoy (3) incorporates a release mechanism (5) that permits buoy (3) to be submersed and subsequently automatically released to ascend to the surface. Mechanism (5) includes cap (16) which hermetically seals a space (8) within which release unit (101) is located. Cap (16) is unitarily formed to include two jaws (28, 29) which are moveable relative to one another to release a pin (20). Movement of jaws (28, 29) is via release unit (101) acting to bias at least one jaw (28) away from the other jaw (29). Release unit (101) may be operated by a remotely transmitted signal, or initiated directly by a timer or a controller where specific circumstances dictate such a release (for example, the internal power source is near deplection). Buoy (3) can be attached to any submerged structure such as crab pot (7).

51 Claims, 24 Drawing Sheets

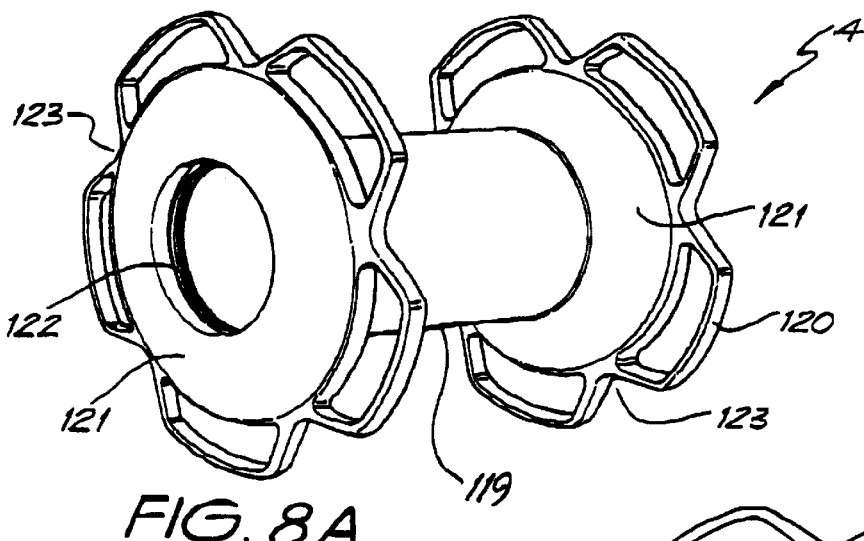
FIG. 8A
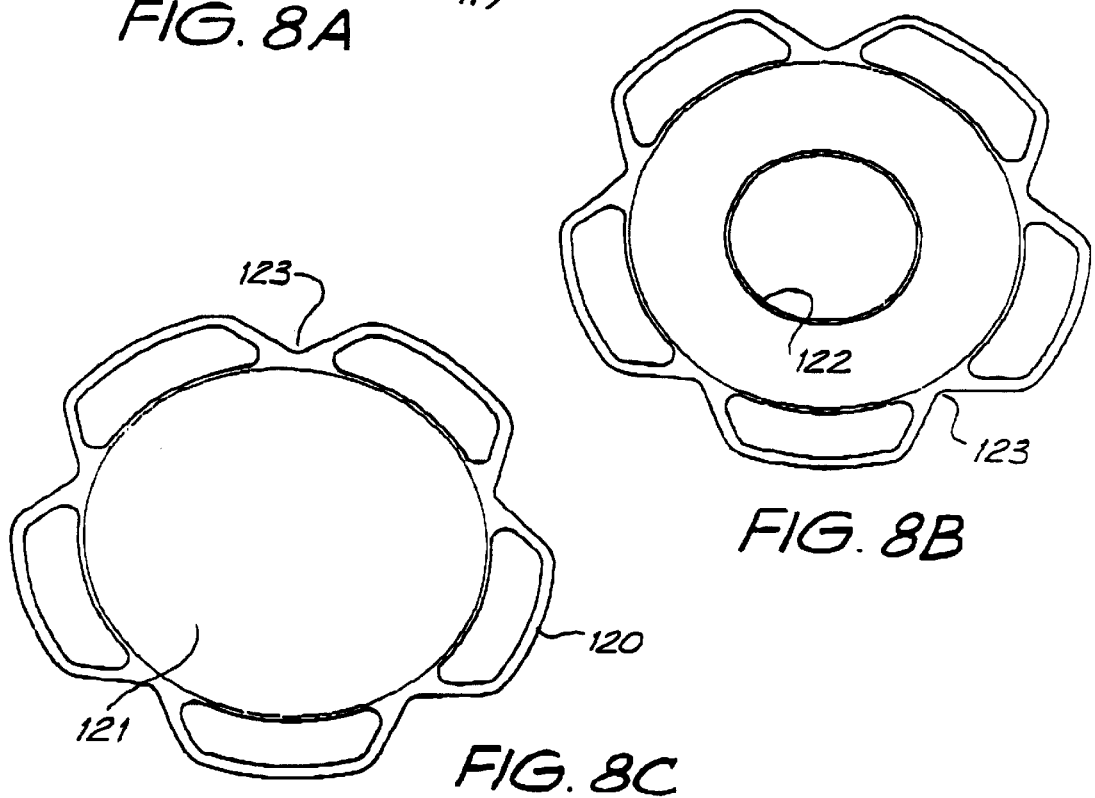
FIG. 8B
FIG. 8C

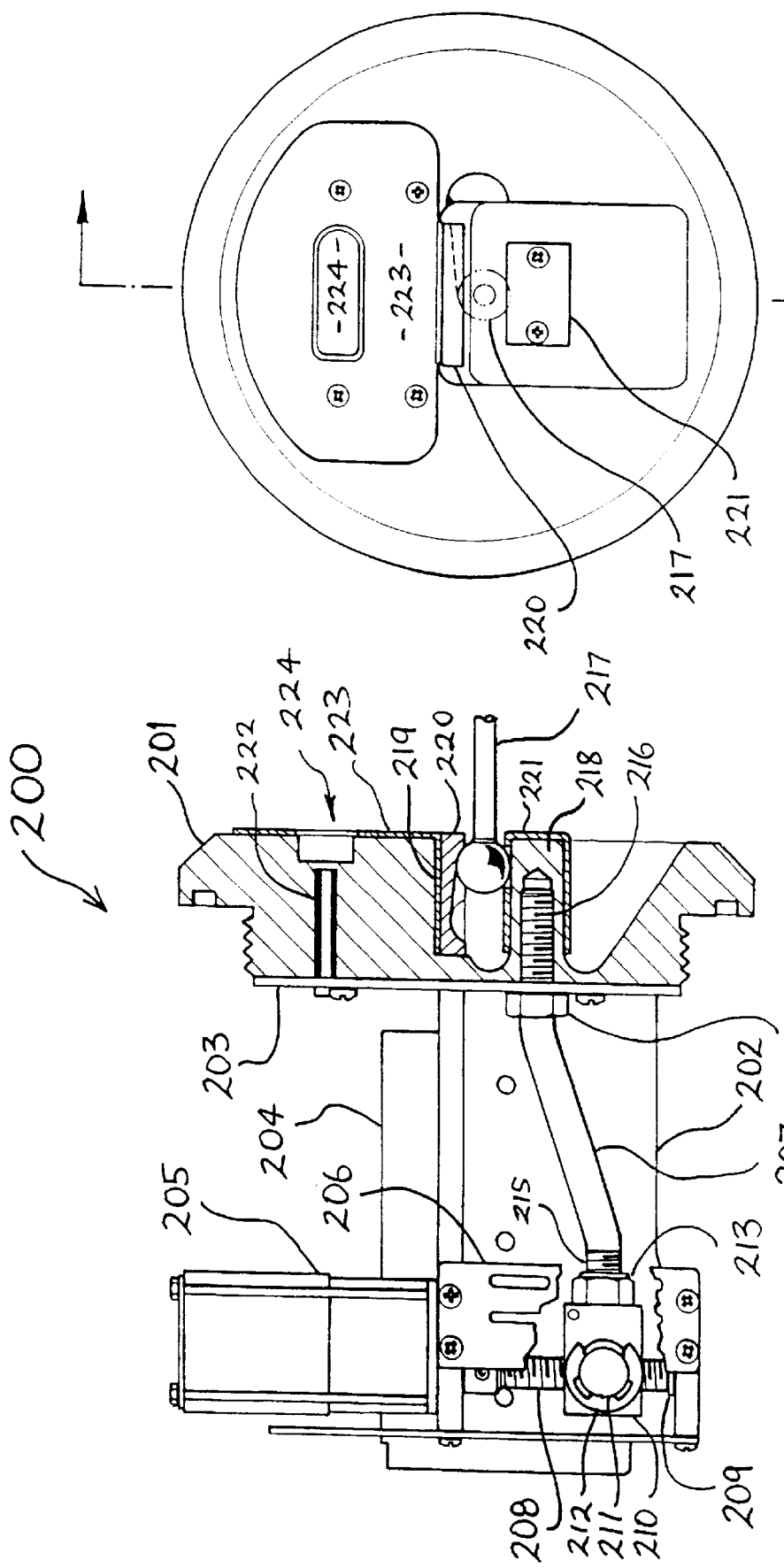

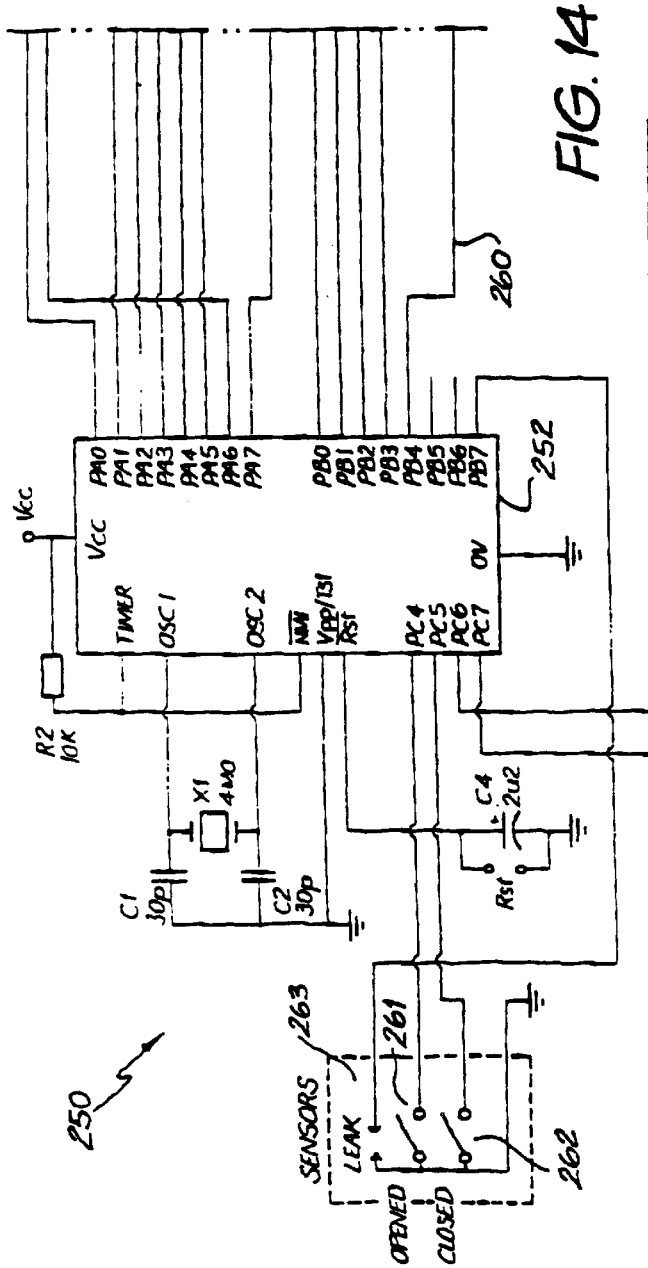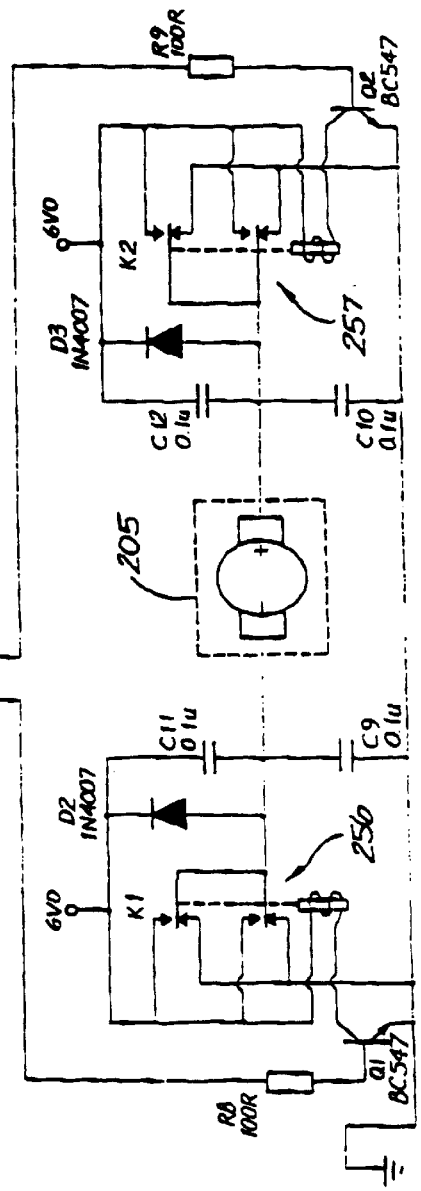
FIG. 14

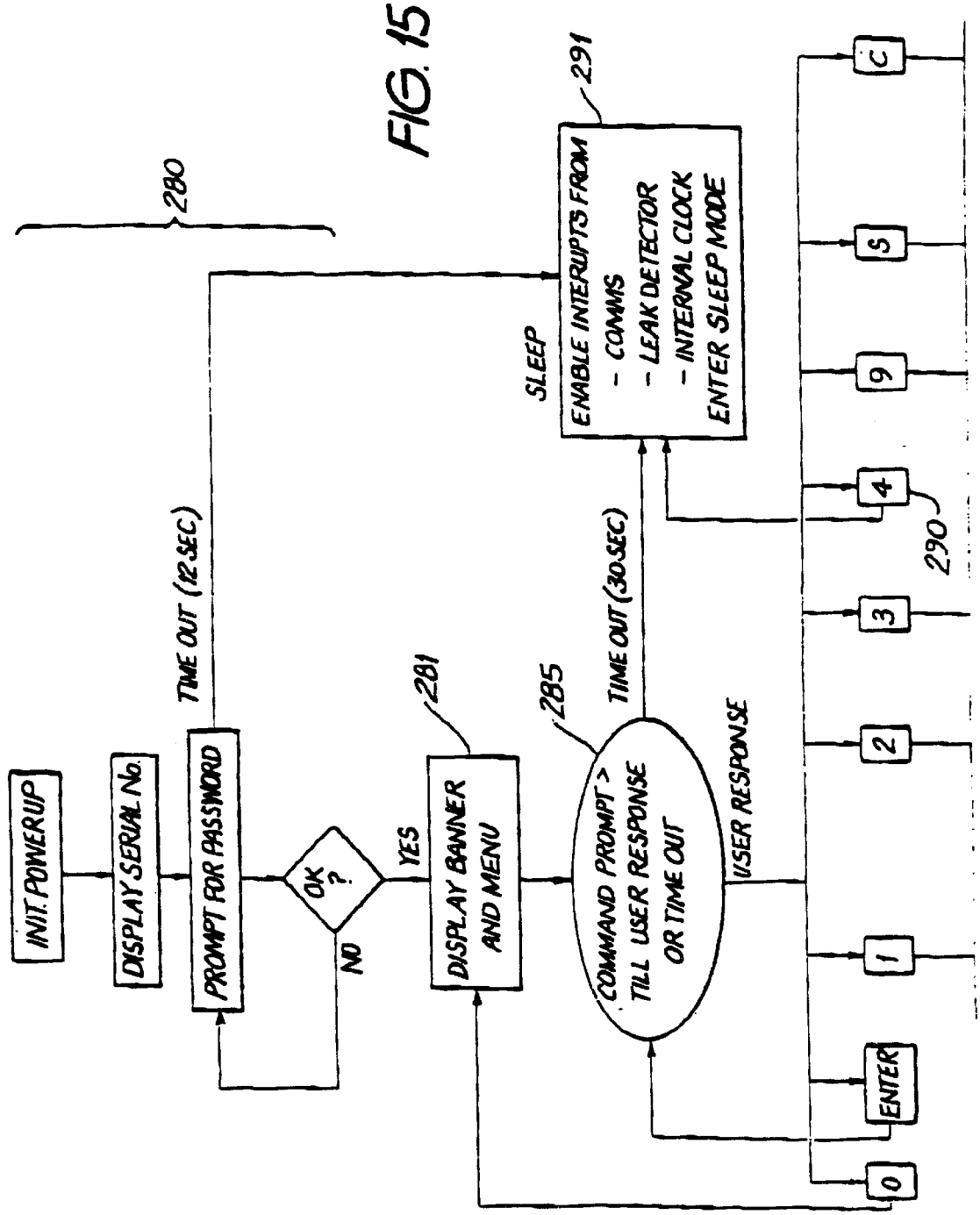

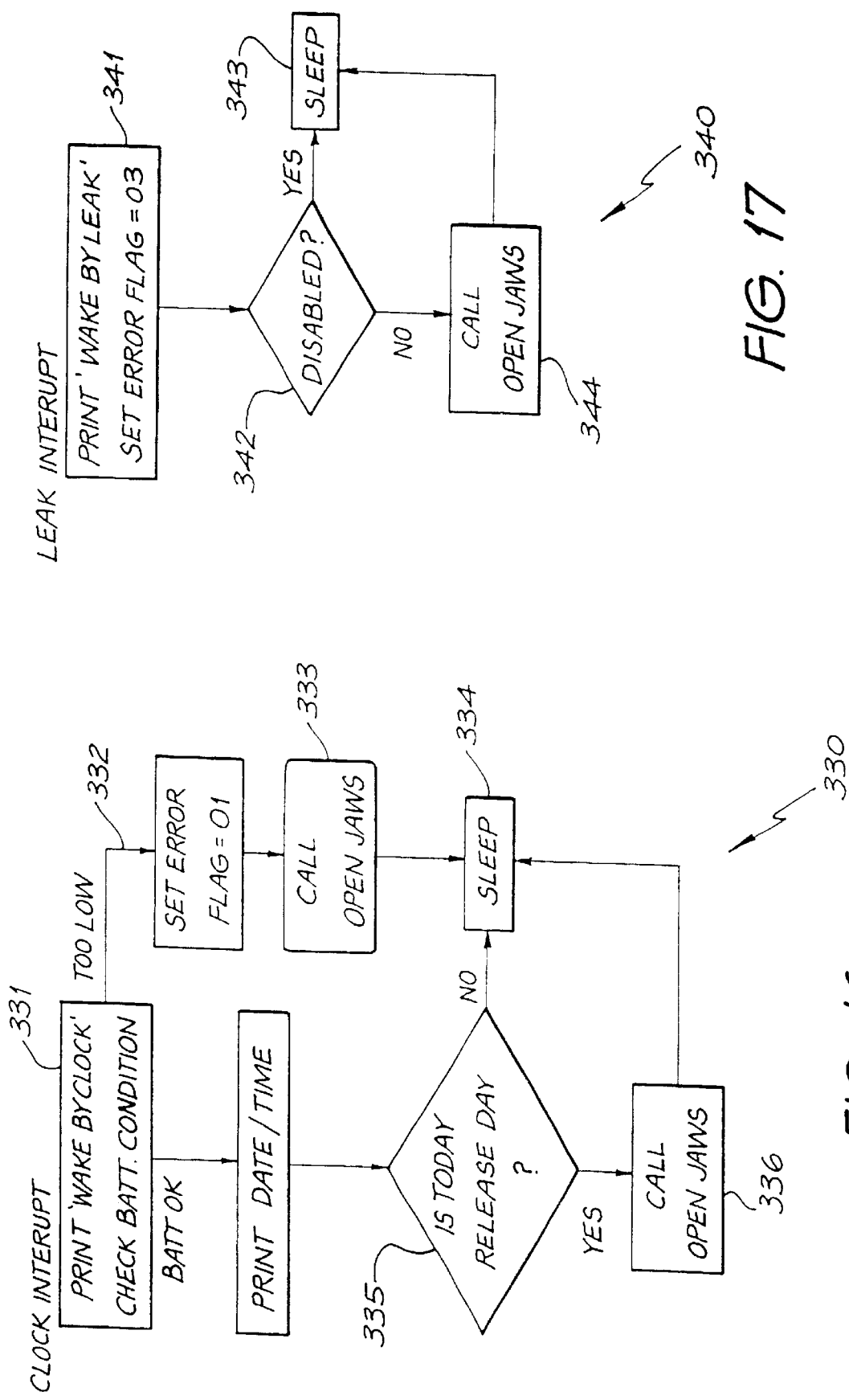

SUBMERSIBLE AND RETRIEVABLE BUOY

FIELD OF THE INVENTION

The present invention relates to aquatic buoys and in particular, to buoys that can be submersed and subsequently retrieved, and also to release systems that can be used in hermetically sealed environments.

BACKGROUND OF THE INVENTION

Aquatic buoys are commonly used in a wide spectrum of marine applications to indicate the location of a particular entity. In addition to use on the water surface, buoys have application in the marking of underwater activities, the objective being to remove surface obstruction and intrusion, in addition to enhancing, the security of assets (eg: scientific, industrial, commercial, military) located underwater.

Where underwater use is desired, it is necessary that the buoy be provided with means that permits reliable release to, and retrieval at, the water surface.

SUMMARY OF THE INVENTION

In accordance with a first aspect of the present invention, there is disclosed a releasable retaining apparatus comprising:

a body having at least two jaws, the jaws being configured to releasably retain a member;

displacing means separated from said member by a hermetic seal formed on said body to confine said displacing means substantially within said body, said displacing means being operable to move at least one of said jaws to release and/or retain the member, wherein said at least one jaw forms at least a part of said hermetic seal.

In accordance with a second aspect of the present invention, there is disclosed a submersible and retrievable buoy comprising:

a spool-shaped body about which can be wound a length of line, one end of which can be affixed to the body;

a hermetically sealed space associated with the body and within which is located an actuator;

a member releasable from the body and to which a medial portion of the line can be attached; and a clamping mechanism operable by said actuator to release and/or retain the member, wherein at least a moveable clamping part of said mechanism comprises at least part of a hermetic seal of said space.

In accordance with another aspect of the present invention, there is disclosed a submersible/retrievable buoy system for use in a body of water, said system comprising:

a transmitting device configured to transmit a signal including information, a buoy in accordance with the second aspect, said buoy further comprising a means for receiving said signal and causing operation of said actuator in accordance with said information, and a payload to which an other end of said line is affixed.

Numerous other aspects of the present invention are also disclosed.

BRIEF DESCRIPTION OF THE DRAWINGS

A number of embodiments of the present invention will now be described with reference to the accompanying drawings, in which:

FIGS. 8A to 8C are perspective, bottom and top views of one buoy body;

FIG. 12A is a representation of a release assembly of another embodiment;

FIG. 12B is an underside view of the end cap of FIG. 12A;

FIGS. 15 to 19 are flow charts representing modes of operation of the arrangement of FIGS. 12A–14.

DETAILED DESCRIPTION

Figure 1A:
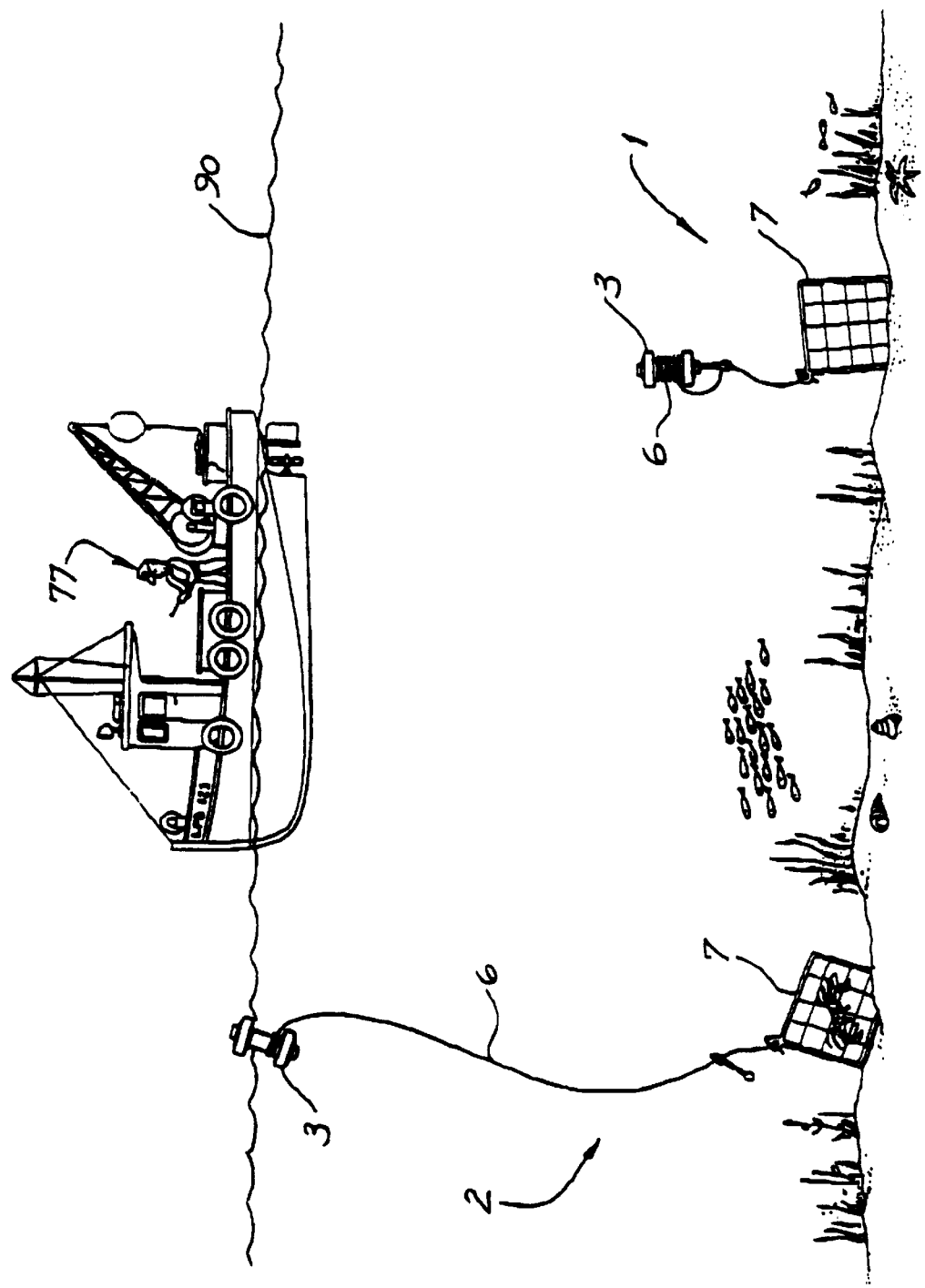
FIG. 1A illustrates the use of a buoy in accordance with one embodiment.

Referring to FIG. 1A, a positively buoyant buoy 3 is shown in a submersed state 1, being held under the surface 90 of a body of water by a line, which in this embodiment is a rope 6 connected to a negatively buoyant payload, in this case a crab pot 7. As apparent from the submersed state 1, the negative buoyancy of the crab pot 7 is of greater magnitude than the positive buoyancy of the crab pot 7.

FIG. 1A also shows the buoy 3 in a retrievable state 2, whereby the rope 6 has been allowed to unwind from the buoy 3. The buoy 3 has thus ascended to the surface 90 of the water due to its positive buoyancy. The buoy 3 however remains connected to the crab pot 7 by the rope 6 and thus the crab pot 7 can be retrieved by a fisherman 77 reeling in the rope 6.

Figure 1B:
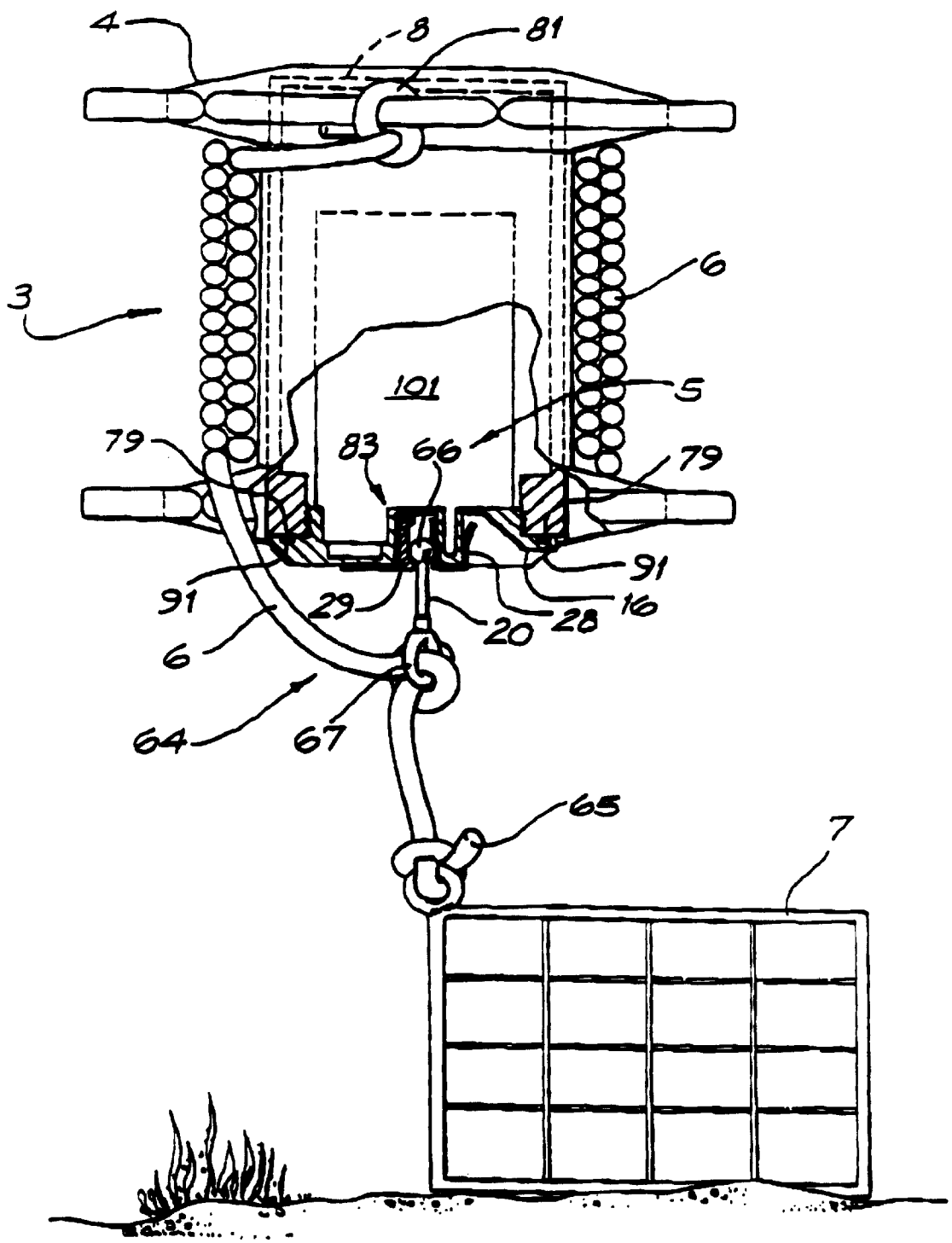
FIG. 1B is a longitudinal cross-section view of the buoy of FIG. 1A.

FIG. 1B illustrates the buoy 3 in greater detail, when in the submersed state 1 connected to the crab pot 7. The buoy 3 is formed of a buoy body 4, which can be manufactured of polyethylene, polypropylene or other plastics material, moulded about a cylindrical drum 8, typically manufactured of aluminium, and a release assembly 5. The release assembly 5 includes a end cap 16 arranged to support a release unit 101. The drum 8 defines a blind hollow, substantially tube-shaped interior within which the release assembly 5 is housed and which is closed by the end cap 16.

The end cap 16 includes a peripheral annular channel 91 within which is located an O-ring 79. The end cap 16 includes a threaded portion 32 adjacent the O-ring 79 and arranged to engage a complementary thread formed in the open end of the drum 8. In this manner, the O-ring 79 and the end cap 16 provide a hermetic seal, effective against the ingress of fluids, including gas and liquids, into the interior of the drum 8 to thus protect the contents thereof (eg. the release assembly 5) from corrosion and damage. The end cap 16 also includes a rope release apparatus 83 having a rope shackle pin 20, a moveable jaw 28 and a fixed jaw 29.

As seen in FIG. 1B, one end of the rope 6 is fixed to the body 4 by means of a knot 81 or the like. The rope 6 is illustrated wound around the body 4 for a length corresponding to a maximum operational depth of water in which the buoy 3 is to be used. After being wound around the body 4, a free portion 64 of the rope 6 is tied or otherwise securely fastened to the rope shackle pin 20, with a free end 65 of the rope 6 being tied or otherwise fastened to the crab pot 7.

The rope shackle pin 20 is typically formed from stainless steel and has an integrally formed ball shaped end 66 arranged to be operatively fixed between the moveable jaw 28 and the fixed jaw 29 in a manner to be described. The other end of the rope shackle pin 20 has a ring or eyelet 67 to which the rope 6 can be tied as illustrated. The rope shackle pin 20 is either retained or released from the confines of the moveable jaw 28 and the fixed jaw 29, depending on a state of the release unit 101, to thus obtain the change in configurations shown in FIG. 1A.

Figure 2:
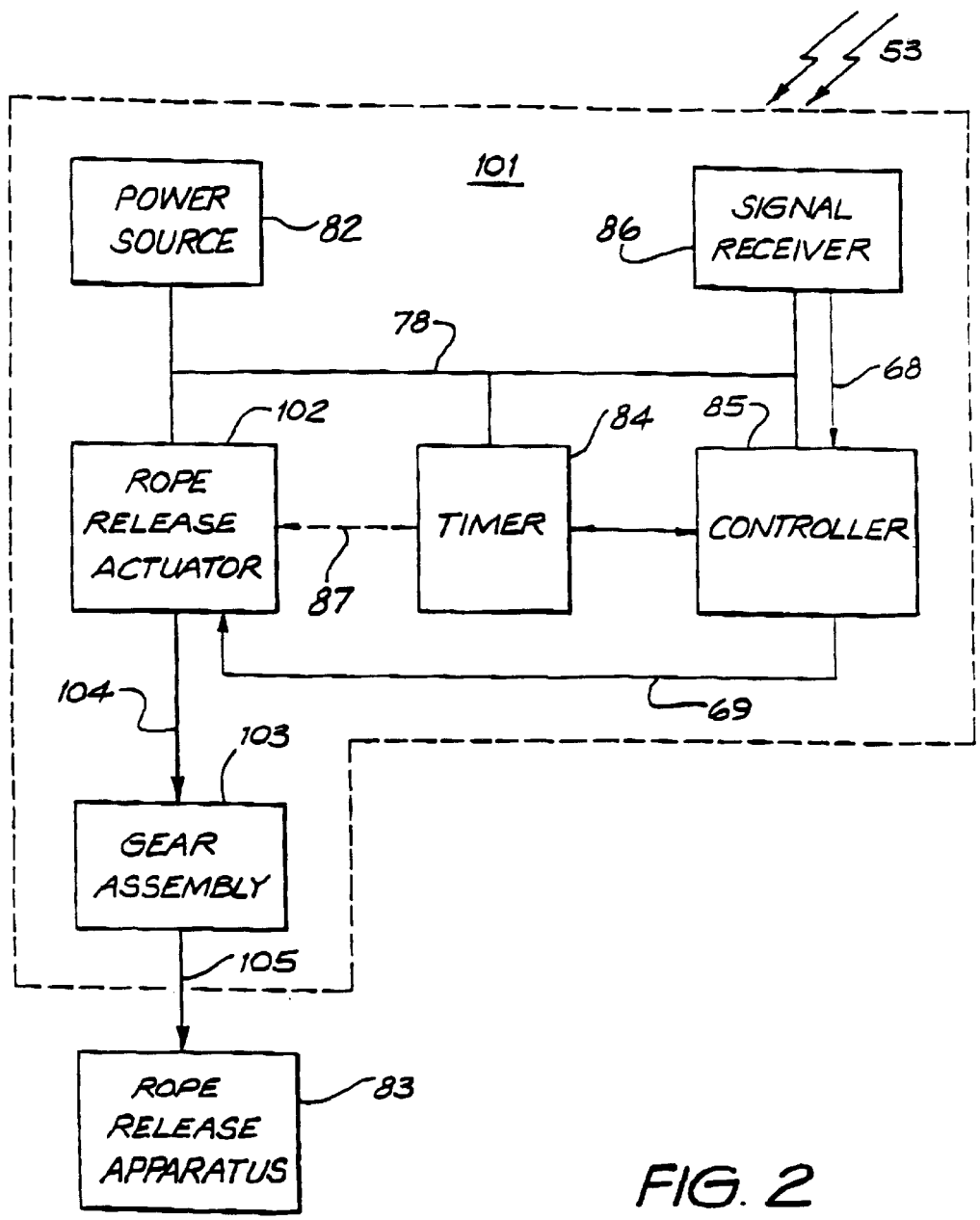
FIG. 2 is a schematic block diagram representation of the main functional components of the buoy of FIGS. 1A and 1B.

Turning now to FIG. 2, the release unit 101 includes a power source 82, a signal receiver 86, a controller 85, a timer 84 preferably incorporating a real-time clock, a rope release actuator 102, and a gear assembly 103. The power source 82 is connected to each of the rope release actuator 102, the timer 84, the controller 85 and the signal receiver 86 to provide the necessary power 78 for each to operate.

The rope release actuator 102 is mechanically connected to the gear assembly 103 as depicted by an arrow 104 and the gear assembly 103 is mechanically connected 105 to the rope release apparatus 83.

The signal receiver 86 is configured to receive a remotely transmitted signal 53 containing information about when the rope release apparatus 83 is desired to be actuated by the rope release actuator 102 via the gear assembly 103. This information on reception is firstly communicated to the controller 85 via a connection 68. The controller 85 is configured to manage the operation of the buoy 3 and to communicate a specific time with the timer 84 in which to actuate the rope release actuator 102 which can then actuate the gear assembly 103 and accordingly, the rope release apparatus 83.

The signal to the rope release actuator 102 to actuate the rope release apparatus 83 can be initiated by either the controller 85 via a direct connection 69, or by the timer 84 via a connection 87. Generally, the signal to the rope release actuator 102 occurs when a predetermined time has been reached (eg: 72 hours after being set, or at 10 am next Friday, Apr. 10, 1998 when harvesting is desired). The controller 85 is also operable to cause release of the buoy 3 where specific circumstances dictate such a response. For example, in the preferred embodiment, the controller 85 is configured to monitor the remaining operating lifetime of the power source 82 so that in the event that where the power source is near depletion, sufficient to prevent operation of the actuator 102, the controller 85 can cause release of the buoy 3, even though the programmed time in the timer 84 has not been reached. Such operation permits the buoy 3 to be retrieved, rather than lost on the ocean floor with no power reserves. Thus, the buoy 3 can be protected against accidental loss caused by the inability to operate. Such operation is assisted by the connection between the controller 85 and the timer 84 being bi-directional, thus enabling the controller to interrogate the time or time remaining before release so as to decide whether or not to provide the actuation signal 69.

Figure 3A:
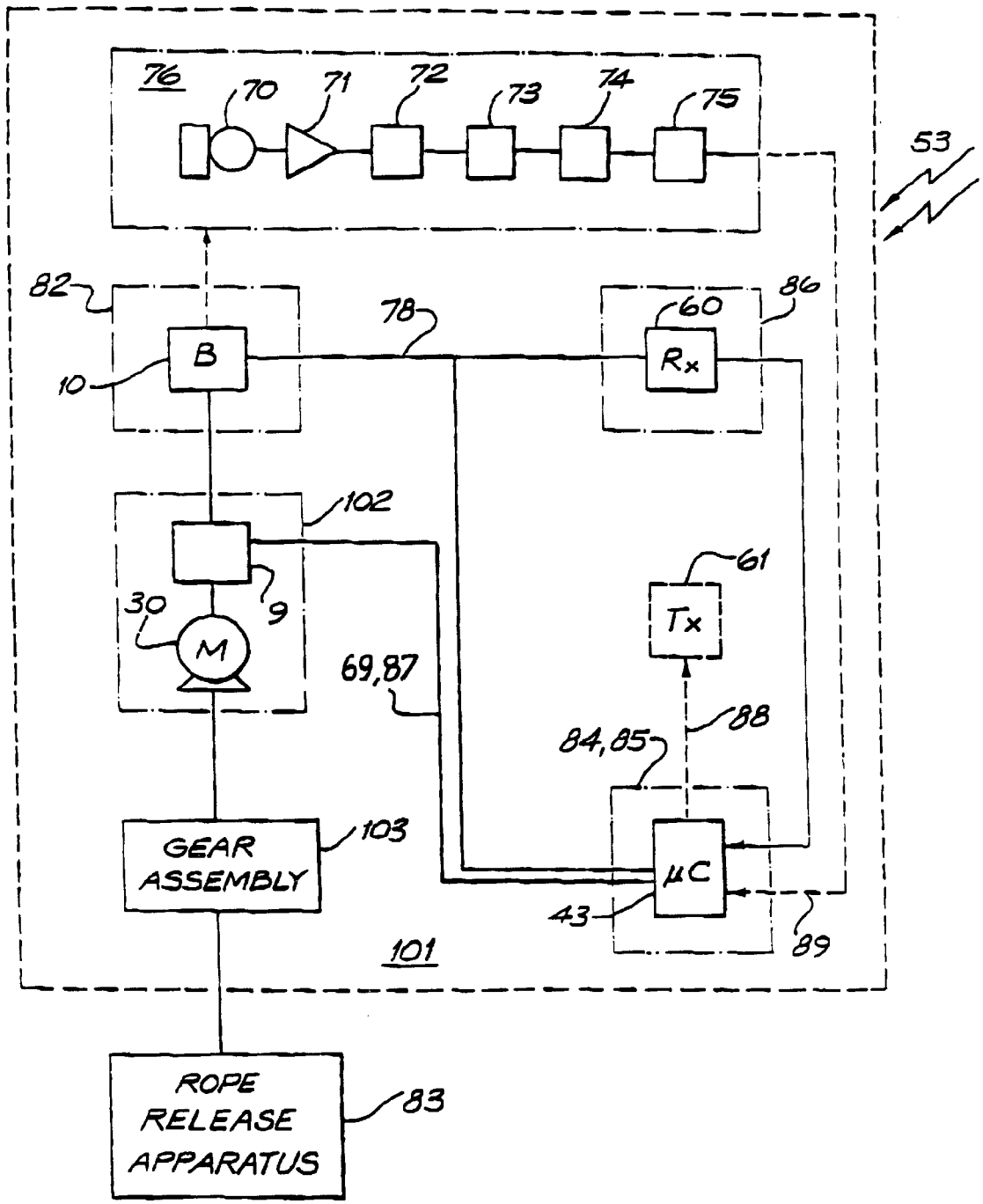
FIG. 3A is a schematic block diagram representation of specific devices that implement the functional components of FIG. 2.

FIG. 3A illustrates how some of the functional components of the release unit 101 of FIG. 2 can be implemented. A battery 10 is provided arranged to provide power 78 so as to operate the rope release actuator 102, the later comprising a motor controller 9 and a motor 30. The battery 10 also provides power 78 to a microcontroller 43 which is configured to implement the functions of both the timer 84 and controller 85. The battery 10 also provides power to an infra-red receiver 60, an infra-red transmitter 61 and an acoustic receiver 76. In order to conserve battery power and thus maximise battery life, the microcontroller 43 is preferably configured to awaken for only 1 millisecond of each second of real-time. Such an arrangement, whilst providing sufficient response time for reliable operation, provides for minimised power consumption.

The infra-red receiver 60 is configured to receive the remotely transmitted infra-red signal 53. Information associated with the signal 53 is communicated to the microcontroller 43. Subject to the programming of the microcontroller 43 and the content of the informationl, the microcontroller 43 is then operable to signal the motor controller 9 via the connection 69,87 which can then enable a motor 30 to be energised. The output of the motor 30 is mechanically connected to the ear assembly 103 to cause operation of the rope release apparatus 83. The motor controller 9 has the ability to cause the motor 30 to operate in reverse to cause reverse movement of the gear assembly 103 and the rope release apparatus 83. This reversal ability allows for the rope release apparatus 83 to be reset after a releasing operation has been performed.

The microcontroller 43 in a specific arrangement can be connected as shown by an connection 89 to the acoustic wave receiver 76. The acoustic wave receiver 76 comprises a hydrophone 70 for receiving an acoustic signal, the electrical output of which is transferred to the microcontroller 43 via various signal conditioning elements including a detection amplifier 71, a filter 72, a preamplifier 73, a detector 74 and a decoder 75. In this arrangement, the remotely transmitted signal as discussed in relation to FIG. 2 can be received by the receiver 76 when the buoy 3 is submersed under water. This can be useful if an initial program, which has a predetermined time for release, is desired to be changed after the buoy 3 has been submersed, or if immediate retrieval is desired.

Another arrangement shown in FIG. 3A includes a transmitter 61 connected to the microcontroller 43 by a connection 88. Generally, the transmitter 60 is configured to allow information to be returned to the source of the remotely transmitted signal as discussed in relation to FIG. 2. Hence, the transmitter 60 can be configured for transmission of either or both of an infra-red and acoustic signal, depending on the desired application.

Figure 3B:
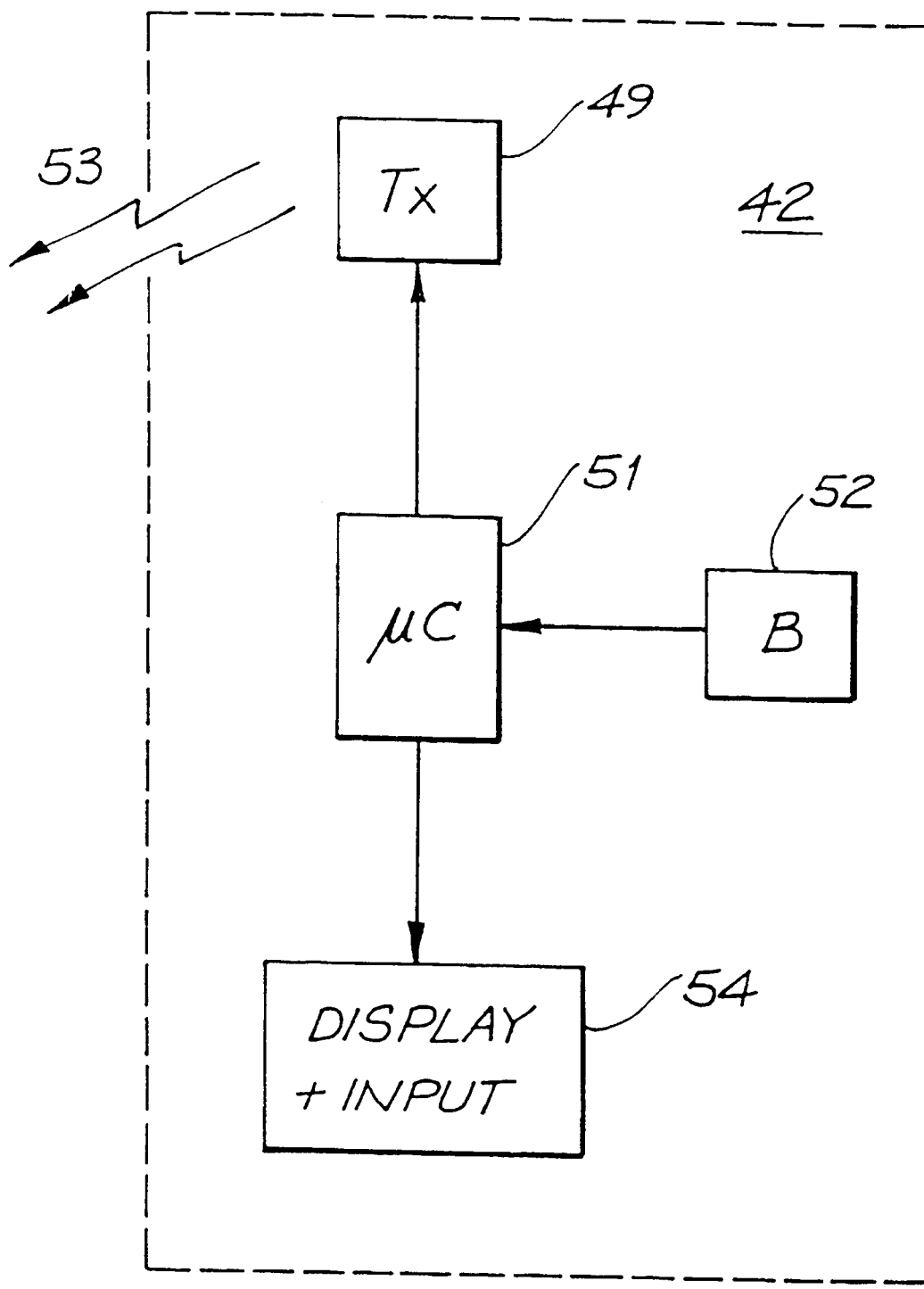
FIG. 3B is a schematic block diagram representation of specific devices within a transmitter to be used with the embodiment of FIG. 3A.

FIG. 3B shows a remote programming unit 42, typically a hand held portable device, configured to transmit the signal 53 which can be received by the signal receiver 86. The remote programming unit 42 includes a microcontroller 51 powered by a battery 52. A transmitter 49 connected to the microcontroller 51 is arranged to emit the signal 53 suitable for reception by the infra-red receiver 60 and/or the sound wave receiver 76. A user interface 54 is also connected to the microcontroller 51, to enable programming of the microcontroller 51 by an operator. The interface 54 can incorporate a touch panel for inputting information by the human operator and/or a display, screen to visually display information about what is being currently programmed, or what has already been programmed.

Figure 4:
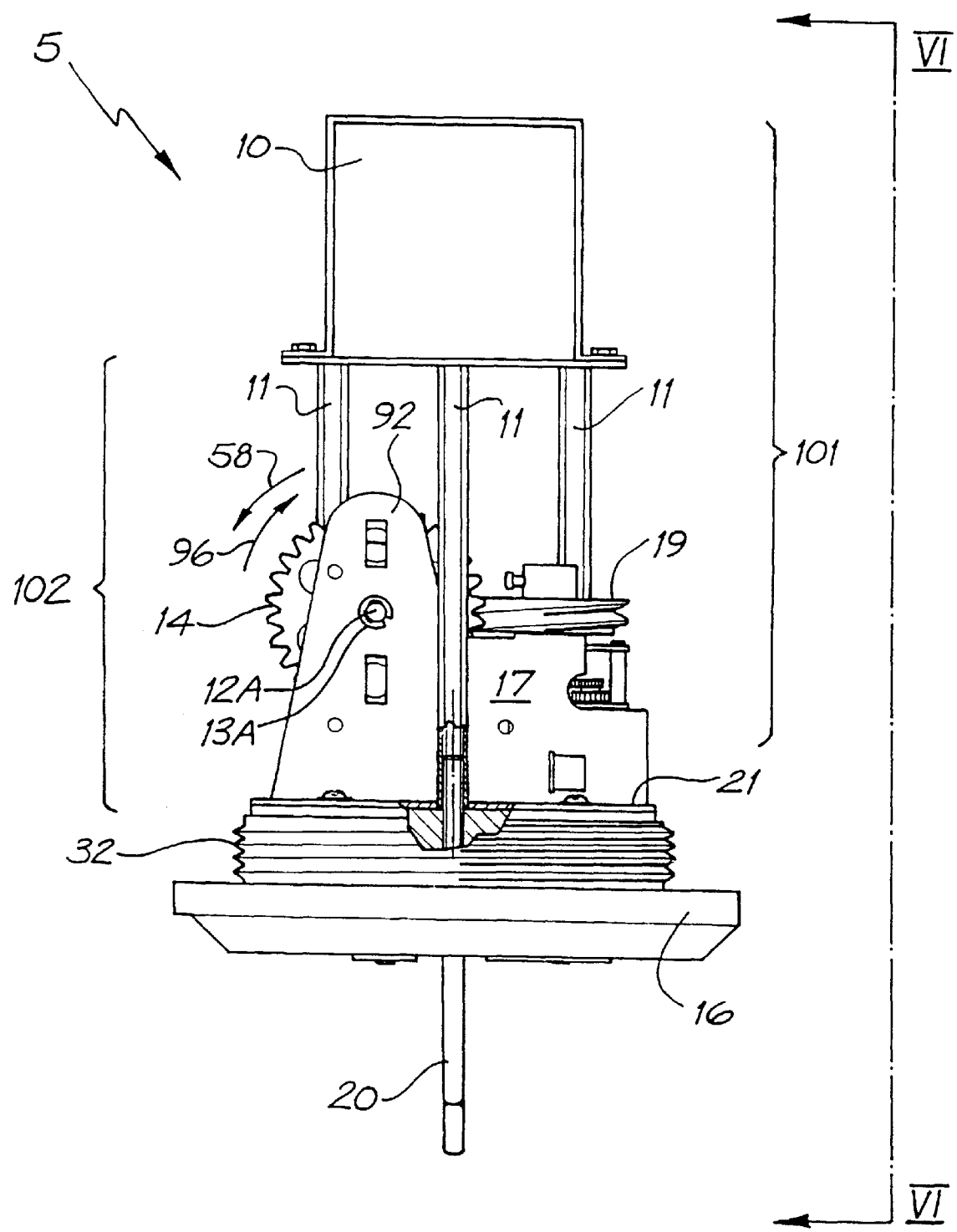
FIG. 4 is a front elevation view of a release mechanisms a end cap and a rope shackle pin in accordance with an embodiment.

Turning now to FIGS. 4 to 8B inclusive, the release assembly 5 can be described. FIG. 4 shows the end cap 16 from which the battery 10 is supported by three stand-off legs 11 arranged extending from the end cap 16. As better seen in FIG. 5A, the rope release actuator 102 includes the motor 30 and an electronics unit 106 both of is which are seated in a well 109 (seen in FIG. 5C) formed in the end cap 16. The electronics unit 106 typically includes at least each of the signal receiver 60, the microcontroller 43 and the motor controller 9.

A chassis base plate 21 is affixed to a substantially disc-shaped face 110 of the end cap 16 to provide strengthening for the end cap 16 and also a foundation for the mounting of other components. A number of apertures are arranged in the chassis base plate 21 to allow protrusion of components including the motor 30, and also a drill blank 27 associated with the rope release apparatus 83 which will be later described. The gear assembly 103 extends from the motor 30 and includes a gear bracket 17, a gear train 33, a worm wheel 19, a gear wheel 14, a connecting rod (conrod) 24 and a gear cam 25. The gear bracket 17 is arranged upon the chassis base plate 21 and provides a mounting facility by which the motor 30 can be positioned and fixed to the gear bracket 17 with a clamp 31.

A main shaft of the motor 30 is arranged to drive the gear train 33 when the motor 30 is energised. Movement of the gear train 33 in turn drives the worm wheel 19. As seen in FIG. 4, rotation of the worm wheel 19 drives the gear wheel 14 in a direction shown by either arrow 58 or arrow 96, depending on a polarity drive provided to the motor 30 by the motor controller 9. The interaction between the worm wheel 19 and the gear wheel 14 alters a rotational movement of the mechanical drive output from the motor 30, from an azimuth plane to an elevation plane.

Figure 6:
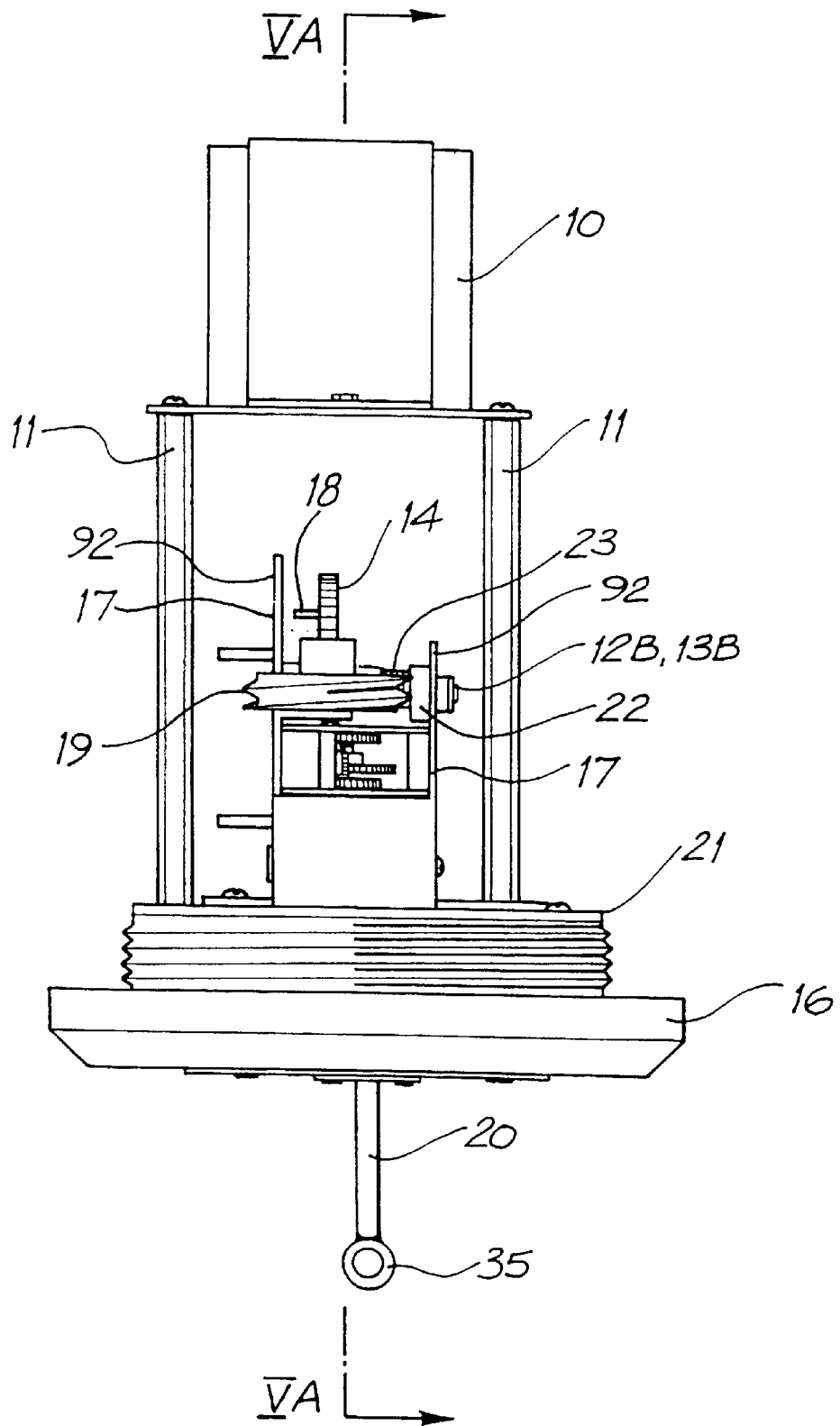
FIG. 6 is a right side longitudinal cross-section view of the arrangement of FIG. 4. as viewed along the line VI—VI of FIG. 4.

The gear wheel 14 has a main shaft 97 which extends through one of two upright wings 92, seen in FIGS. 4 and 6, associated with the gear bracket 17. A first end 12A of the main shaft 97 is held in place by a first external circlip 13A. Referring to FIG. 6, a second end 12B of the main shaft 97 is shown, the second end 12B being extended through the other one of the two upright wings 92 of the gear bracket 17 and held in place by a second external circlip 13B.

Returning to FIG. 5A, the main shaft 97 is seen in cross-section but beyond the gear wheel 14, so that gear wheel 14 (seen in FIG. 4) is not apparent. The main shaft 97 has arranged thereon the gear cam 5, the circumference of which is arranged to be operatively slidable inside the conrod 24 with the aid of a ball bearing 98. A dowel pin 26 provides a second anchorage of the conrod 24 to the cam 25 to give a desired pendulum motion of the conrod 24.

Figure 5A:
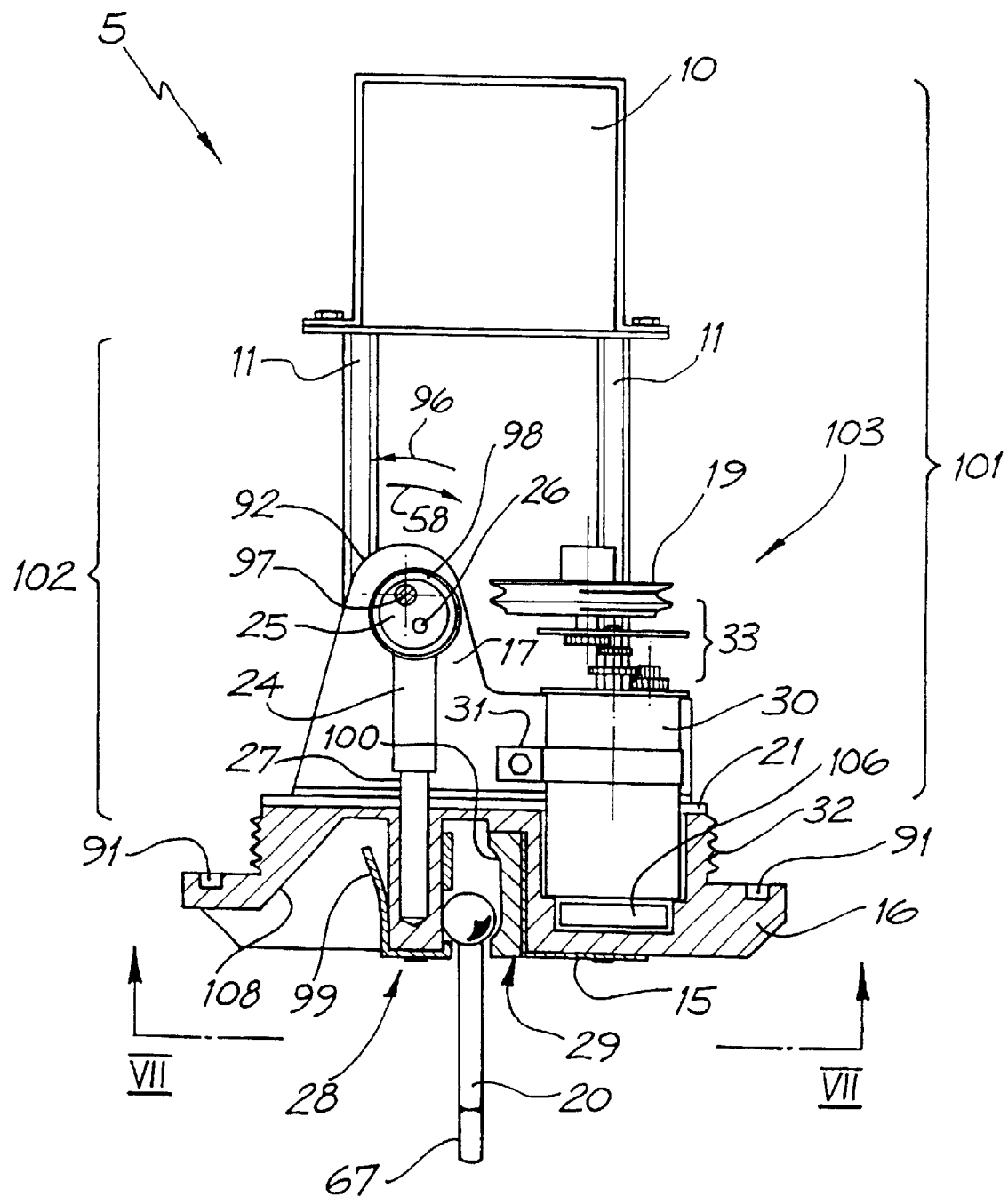
FIG. 5A is a front longitudinal cross-section view of the arrangement of FIG. 4 in a closed configuration.
Figure 5B:
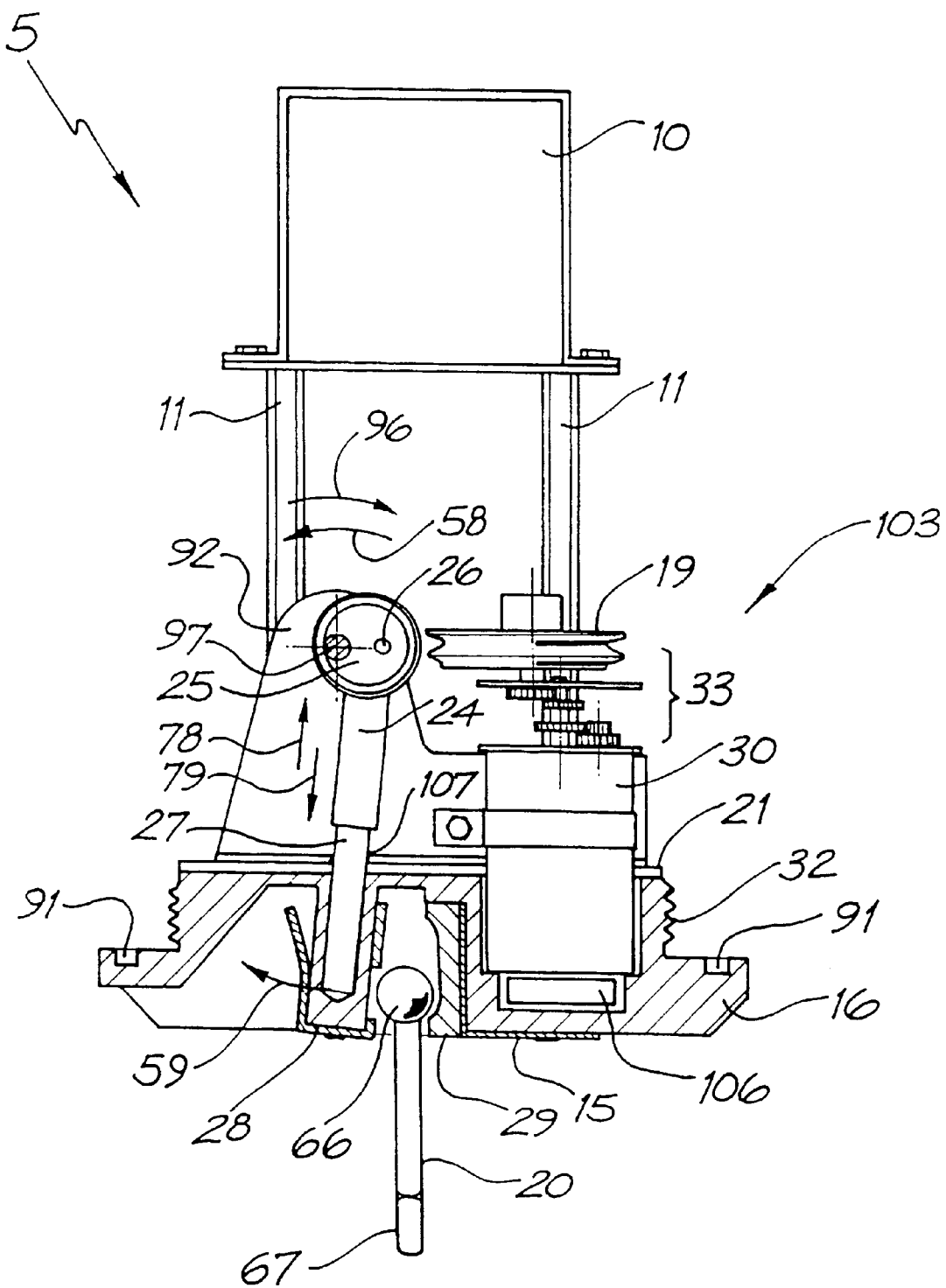
FIG. 5B is a front longitudinal cross-section view of the arrangement of FIG. 4 in an open configuration.
Figure 5C:
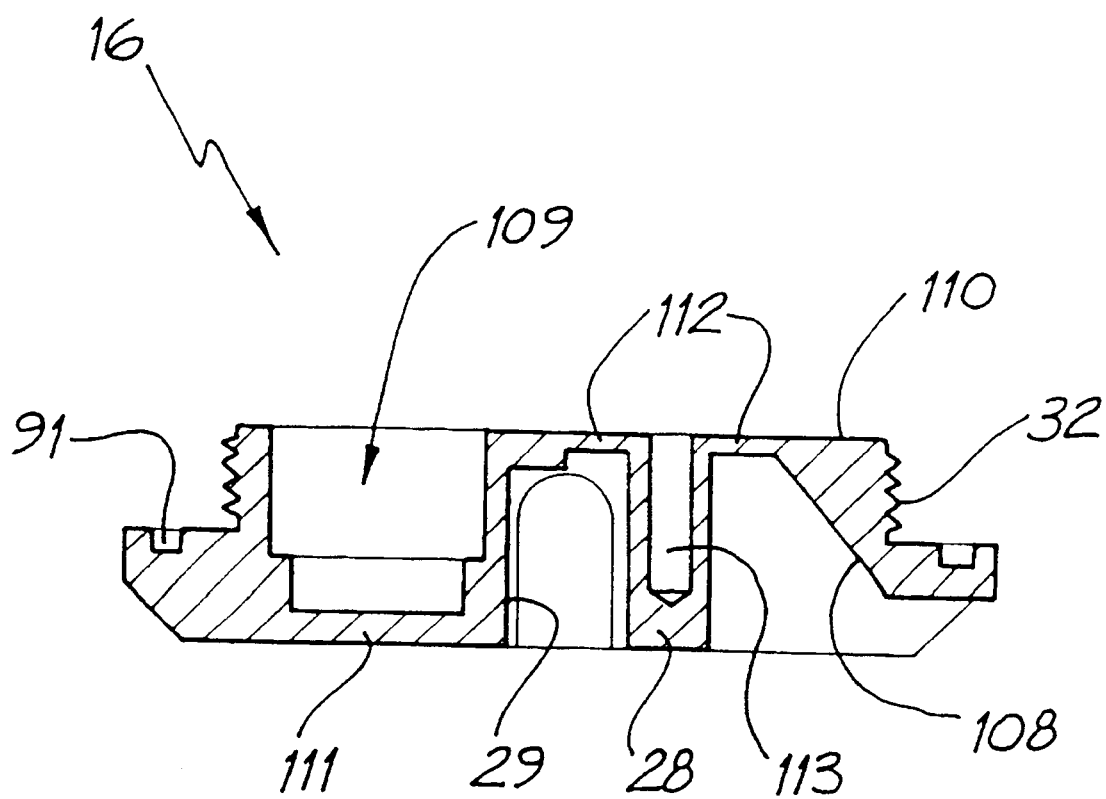
FIG. 5C is an enlarged rear cross-sectional view of the end cap.
Figure 7A:
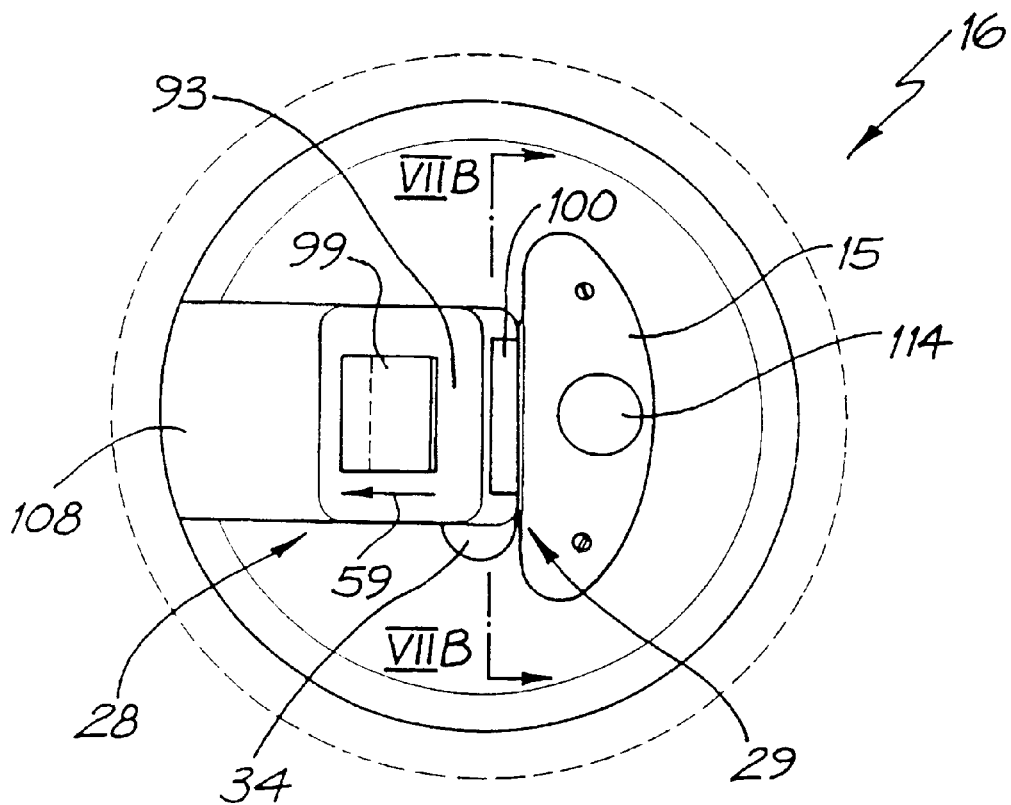
FIG. 7A is an underside view of the end cap as viewed along the line VII—VII of FIG. 5A.

As best seen in FIG. 5C, the end cap 16 is machined from a solid block of plastics material, such as UHMW polyethylene, having strong, but resiliently flexible properties when appropriately sized. Other suitable substitute materials may be used. The machining of the end cap 16 forms the well 109 in which the motor 30 and electronics module 106 are situated. In the preferred embodiment, the polyethylene is translucent and the machining of the well 109 forms a thin outer section 111 at which the infra-red receiver 60 and transmitter 61 are positioned such that the thin section 111 forms a window 114 (see FIG. 7A) through which bi-directional infra-red communications can take place. As seen in FIGS. 5A, 5B and 7A, a sensor locater plate 15 is provided about the exterior of the window 114 to provide mechanical reinforcement thereto so as to prevent distortion of the thin section 111 and/or fracture under pressures found at depth, as well as inadvertent damage.

The end cap 16 is also machined from its operationally exposed face to define the movable jaw 28 which appears as a post extending into an exterior well bounded on one side by the fixed jaw 29, and on the other by a sloping face 108. The machining about the fixed jaw 28 creates a substantially annular thin section 112 in the face 110 which is sufficiently thin so as to permit the movable jaw 28 to resiliently flex, whilst being sufficiently thick so as to avoid fracture, distortion or other failure through multiple flexations of the jaw 28, particularly when combined with the effects of pressures at depth. The chassis base plate 21 attached to the face 110 assists in reinforcing the thin section 112. The sloping face 108 is provided to discourage a build up of debris (eg. oysters, barnacles) in the end cap 16 which might otherwise inhibit the operational movement of the fixed jaw 28.

Formed in the movable jaw 28 and extending from the face 110 is a blind channel 113 in which the drill blank 27 is secured and configured to protrude from the chassis base plate 21 to be slidably located with the conrod 24 so as to cause flexing of the movable jaw 28. Thus, the machining of the end cap 16 allows the moveable jaw 28 and the fixed jaw 29 to be integrally formed into the end cap 16, thereby avoiding the need for a movable seal, but rather a seal that is able to resiliently flex.

Figure 7B:
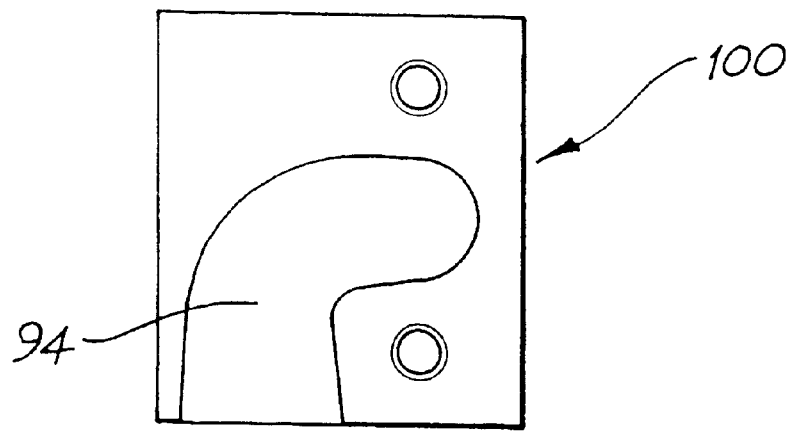
FIG. 7B is a fixed jaw insert associated with the embodiment of FIG. 4, as viewed along the line VII—VII of FIG. 7A.

As seen in FIGS. 5A, 5B and 7A, a fixed jaw insert 100 is attached to the machined part of the fixed jaw 29 and a movable jaw insert 99 is attached to the machined part of the movable jaw 28. The inserts 99 and 100 are typically formed of stainless steel and are provided to prevent wear to the faces of the jaws 28 and 29 that can occur through contact with the shackle pin 20. As seen in FIGS. 7A and 7B, a recessed entry void 34 is moulded or machined into the end cap 16 which allows the ball end 66 of the rope shackle pin 20 to enter a trap 93 defined by the moveable jaw insert 99 and the fixed jaw insert 100. The ball end 66 is guided and positioned into place after travelling along a slot 94 recessed into the fixed jaw insert 100.

Referring now to FIG. 5B, the release assembly 5 of FIG. 5A is shown, but with a progressed rotation of the main shaft 97 of the gear wheel 14 (FIG. 4) in a direction shown by the arrow 58. In FIG. 5B, the main shaft 97 has progressed for about a quarter of a single revolution from its position shown in FIG. 5A, resulting in an eccentric rotation of the gear cam 25. This movement causes a displacement of the conrod 24 in the direction shown by arrow 78 which in turn has the effect of displacing the drill blank 27 of the movable jaw 28 in the direction 59. A virtual pivot point 107 of this movement is created. Thus, with sufficient movement, the movable jaw 28 is biased away from the fixed jaw 29 so that the rope shackle pin 20 can be released from the confines of the movable jaw 28 and the fixed jaw 29. The movable jaw 28 is held open by virtue of the high ratio of the gear assembly 103. The time taken for the quarter of a single revolution progression just described is approximately 30 seconds, which is indicative of the high gear ratio and resilience of the end cap material used in the preferred embodiment. Normally, the moveable jaw 28 can be reset back into the closed position shown in FIG. 5A from the open position in FIG. 5B by reversing the rotation of the motor 30, which reverses the rotation of the main shaft 97 in a direction shown by arrow 96.

A position sensor 18, fixed to the gear wheel 14, as seen in FIG. 6, is provided to communicate a signal to the motor controller 9 related to the movement of the jaw 28. The position sensor 18 can be formed of any suitable arrangement such as a magnetic limit switch or an optical switch. A signal is sent from the position sensor 18 to the controller 85 when the main shaft 97 (FIG. 5B) has progressed from the position shown in FIG. 5A to the position shown in FIG. 5B. In response to this signal the motor 30 (FIG. 5A and FIG. 5B) is stopped by the controller 85 (FIG. 2), thus retaining the moveable jaw 28 in the open position shown in FIG. 5B. The motor 30 (FIG. 5A and FIG. 5B) can then be reversed when it is desired to reset to the moveable jaw 8 into a closed position. This reversal of the motor 30 results in the main shaft 97 (FIG. 5B) rotating in the direction shown by arrow 96 (FIG. 5B), so as to return to the configuration shown in FIG. 5A.

Referring to FIGS. 8A to 8C, one preferred example of the body 4 of the buoy 3 of FIG. 1B is illustrated. The body 4 is spool-shaped having a central cylinder 119 moulded about the drum 8, and from the ends of which extend corresponding flanges 121. Several handles 120 are arranged on a periphery of each flange 121 as shown. The handles 120 provide a convenient means by which the buoy 3 can be manually grasped, whilst the V-shaped sections 123 between adjacent handles 120 provide locations through which the free portion of the rope 6 can be held tightly whilst the pin 20 is held within the jaws 28 and 29, thus preventing undesired unwinding of the rope 6. This provision of the handles 120, and partly because of their semi-rectangular shape, also allows friction to develop when the rope 6 is being unwound from the body 4 whilst the buoy 3 is ascending to the surface 90 of the water (FIG. 1). This friction can result in a reduction of the speed of ascent of the buoy 3. thus reducing the chances of the rope 6 becoming tangled and/or the buoy 3 damaging surface craft. FIG. 8B is a bottom view of the body 4 of FIG. 8A illustrating a thread 122 of the drum 8 into which the release assembly 5 (FIG. 1B) can be screw fitted.

Figure 9:
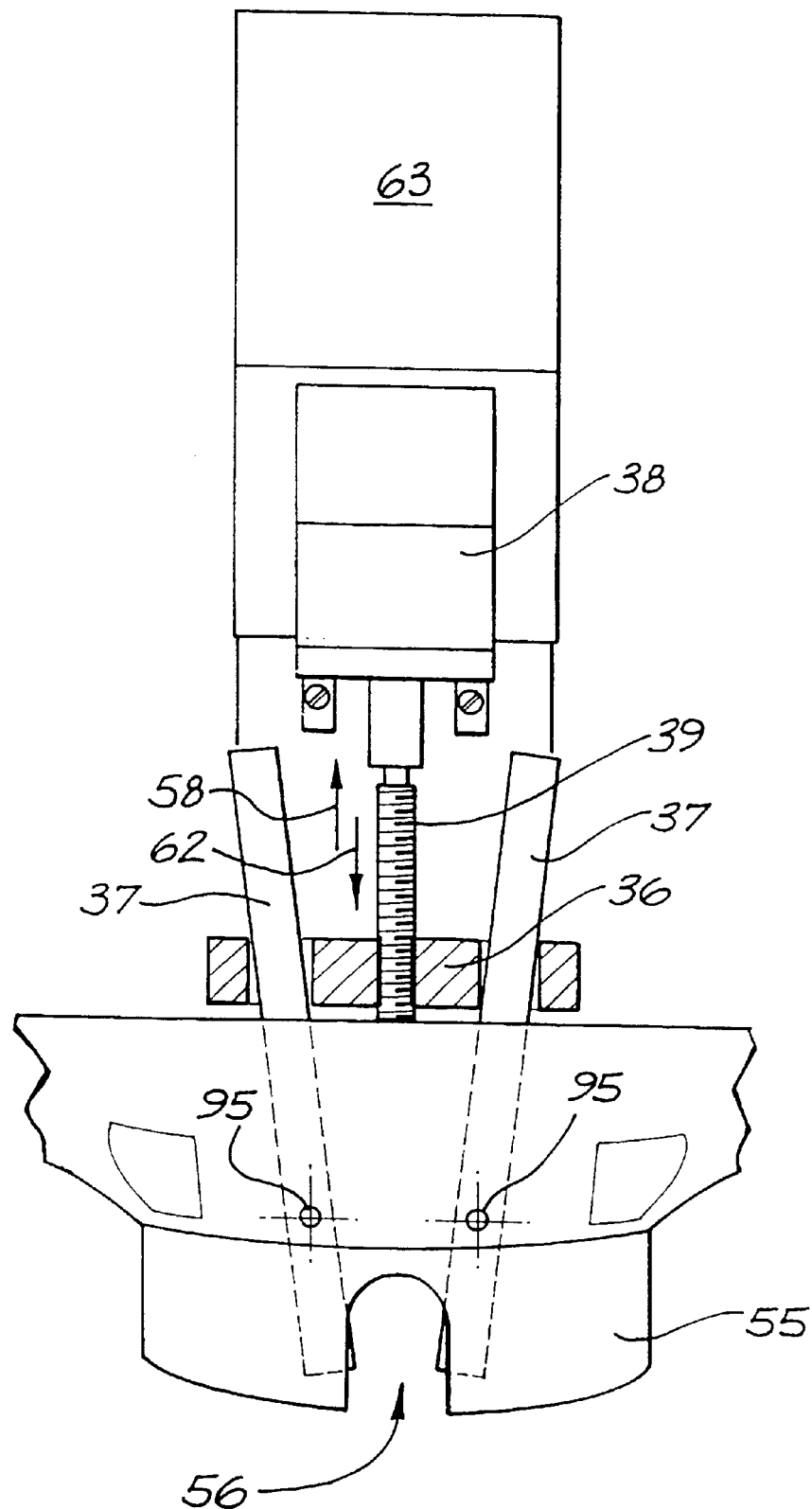
FIG. 9 is a front elevation view of a release mechanism and a end cap in accordance with another embodiment.
Figure 10:
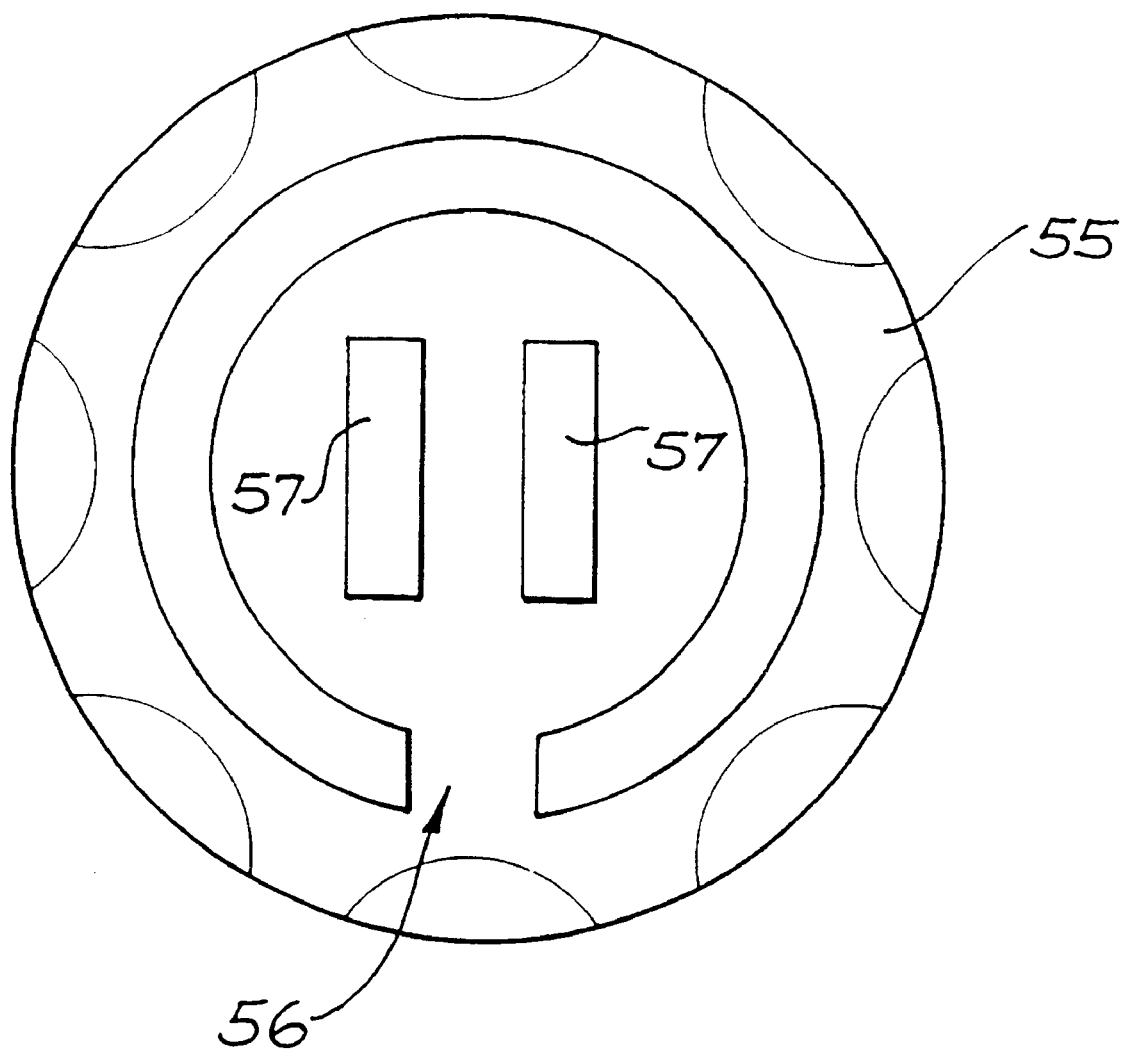
FIG. 10 is an underside view of the end cap of FIG. 9.

FIGS. 9 and 10 show an alternative embodiment of the release mechanism 5. An end cap 55 is moulded to include a shackle pin entry 56 which can receive the ball end 66 of the rope shackle pin 20. A pair of actuating arms 37 are provided which extend through the end cap 55 to form a pair of jaws 57. The actuating arms 37 each include a pivot 95 within the end cap 55 and are sealed using resiliently flexible sealants about the pivots 95 to prevent the ingress of water into the interior of the buoy.

A motor 38 is positioned so that a screw threaded shaft 39 extending therefrom can drive a block 36, through which each of the arms 37 pass, in a direction shown by arrows 58 and 62. When the screw threaded shaft 39 is rotated in a first direction, the block 36 is displaced in the direction shown by arrow 58. This causes each of the actuating arms 37 to pivot toward a diametrical centre of the screw threaded shaft 39. When the screw threaded shaft 39 is rotated in a second direction, the block 36 is displaced in the direction shown by arrow 62, which pivots each of the actuating arms 37 away from a diametrical centre of the screw thread shaft 39. The actuating arms 37 thus form a pair of moveable jaws 57 beyond the pivot points 95 and adjacent to the shackle pin entry 56.

Referring to FIG. 10, the arrangement of the moveable jaws 57 and the shackle pin entry 56 in relation to the underside of the end cap 55 can be seen. An electronics unit 63 provides the necessary operational control, for the motor 38 in the manner described above.

Figure 11A:
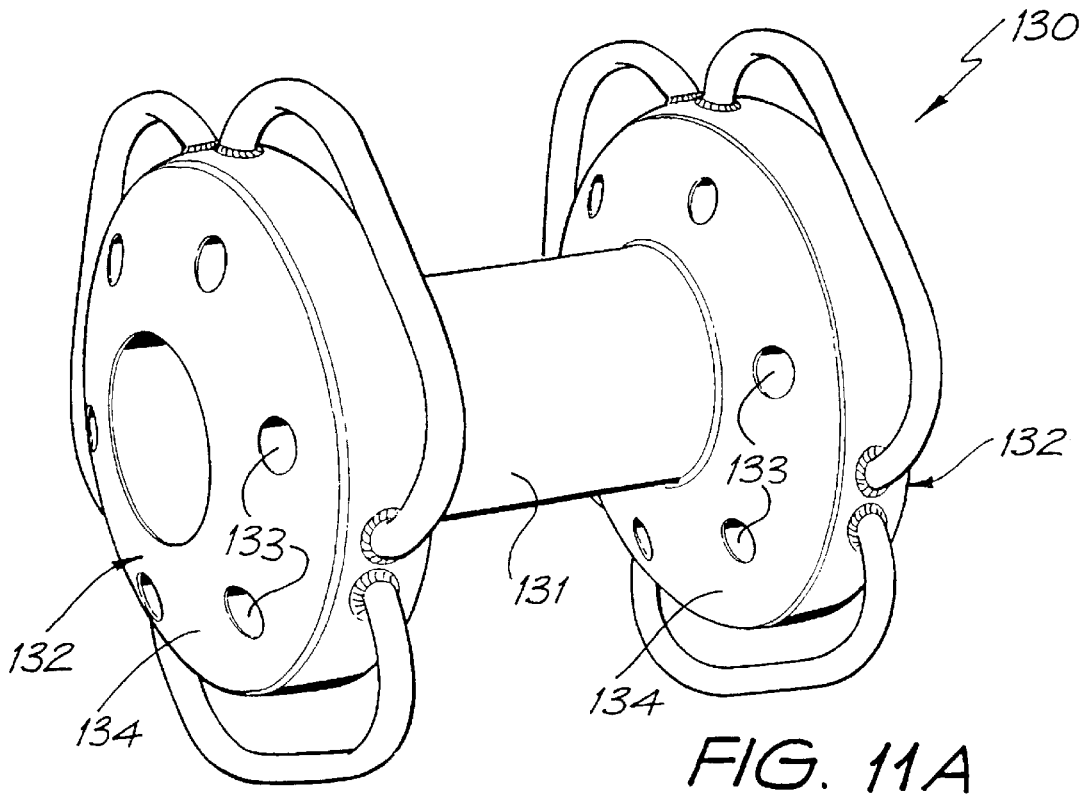
FIGS. 11A and 11B are perspective and bottom views of another buoy body.
Figure 11B:
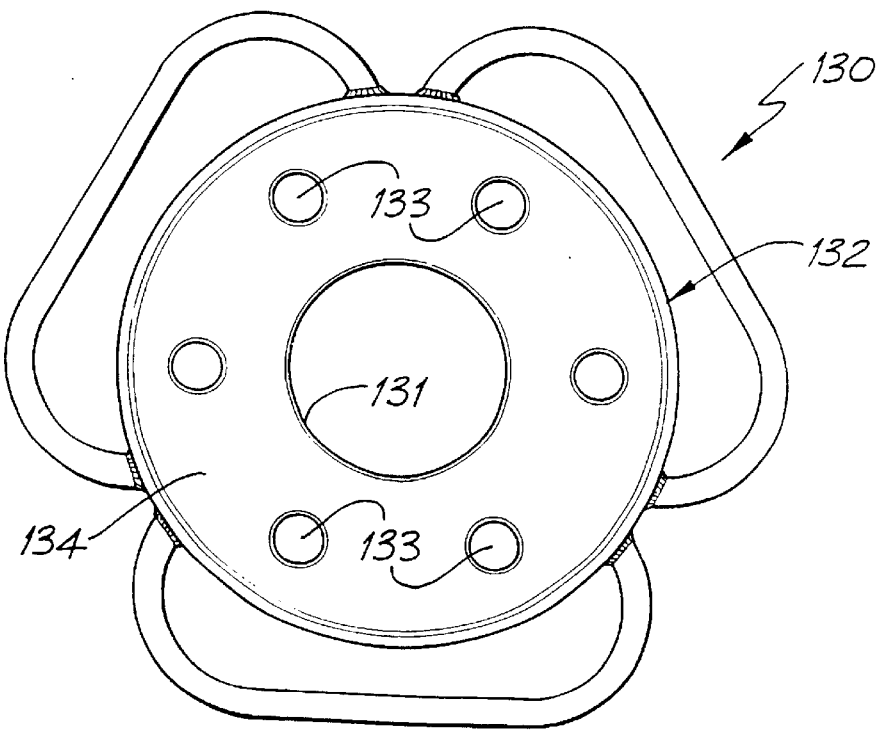

An example of another buoy body 130 is shown in FIGS. 11A and 11B. The body 130 is preferably formed from aluminium and includes a central cylinder 131 having flanges 132 formed on each end thereof. The flanges 132 are hollow to provide positive buoyancy to the body 130 and are each provided with a number of cylindrical apertures 133. The apertures 133 are formed from metal tubes welded between the annular side faces 134 of each flange 132. The apertures 132 act to reinforce the sides 134 from collapse due to pressures found at depth.

The release mechanisms of FIGS. 4 to 7B, and FIGS. 9 and 10 can each be used with either of the buoy body's of FIGS. 8A to 8C or FIGS. 11A and 11B.

FIGS. 12A and 12B show an alternative release mechanism assembly 200 which is formed upon an end cap 201 similar to that used in the embodiments of FIGS. 4 to 7B. In this embodiment, a chassis assembly 202 extends from a base plate 203 secured to the end cap 201. The chassis assembly 202 is formed from a number of brackets upon which the operative components of the release mechanism assembly 200 are mounted. In particular, a battery pack and electronic circuit 204 mounts to the rear of the chassis assembly 202 and, on a proximal side, a motor 205 incorporating a 100:1 gearbox is mounted and from which a drive screw 208 extends. A non-driven end of the drive screw 208 is retained by a drive screw bush 209 mounted upon the chassis assembly 202. A clevis 210 envelops a portion of the drive screw 208 and incorporates a drive nut 211 which couples the clevis 210 to the drive screw 208. As seen, the drive nut 211 is retained in the clevis 210 by a circlip 212. In this fashion, as the drive screw 208 turns, the drive nut 211 and hence the clevis 210 move along the length of the drive screw 208.

Extending from the clevis 210 is a dog leg lever arm 207 having, a first threaded end 215 securely coupled to the clevis 210 by means of a nylocks nut 213. The other end 216 of the dog leg lever arm 207 is also threaded and is configured to engage a complementary thread formed within a moveable jaw 218 of the end cap 201. A further nylock nut 214 secures the dog leg lever arm 207 to the end cap 201, the nut passing through an aperture 228 (seen in FIG. 13) formed in the base plate 203. In this fashion, bending moments upon the arm 207 result in pivoting at the nut 214.

As with the previous embodiments, the end cap 201 is formed with a fixed jaw 219 upon which a fixed jaw insert 220 is attached to locate a rope shackle pin 217 between the fixed jaw insert 220 and a complementary moveable jaw, insert 221 attached to the moveable jaw 218. A jaw plate 223 is attached to an exterior portion of the end cap 201 to define a window 224 through which infra-red communications may occur. As seen in FIG. 12A, a black polythene tube communicates from a location adjacent the electronics module and battery pack 204 to the thin section adjacent the window 224. In this fashion, two polythene tubes (only one of which is seen) 222 supply the window 224, one tube for transmission and one tube for reception of infra-red signals.

Figure 13:
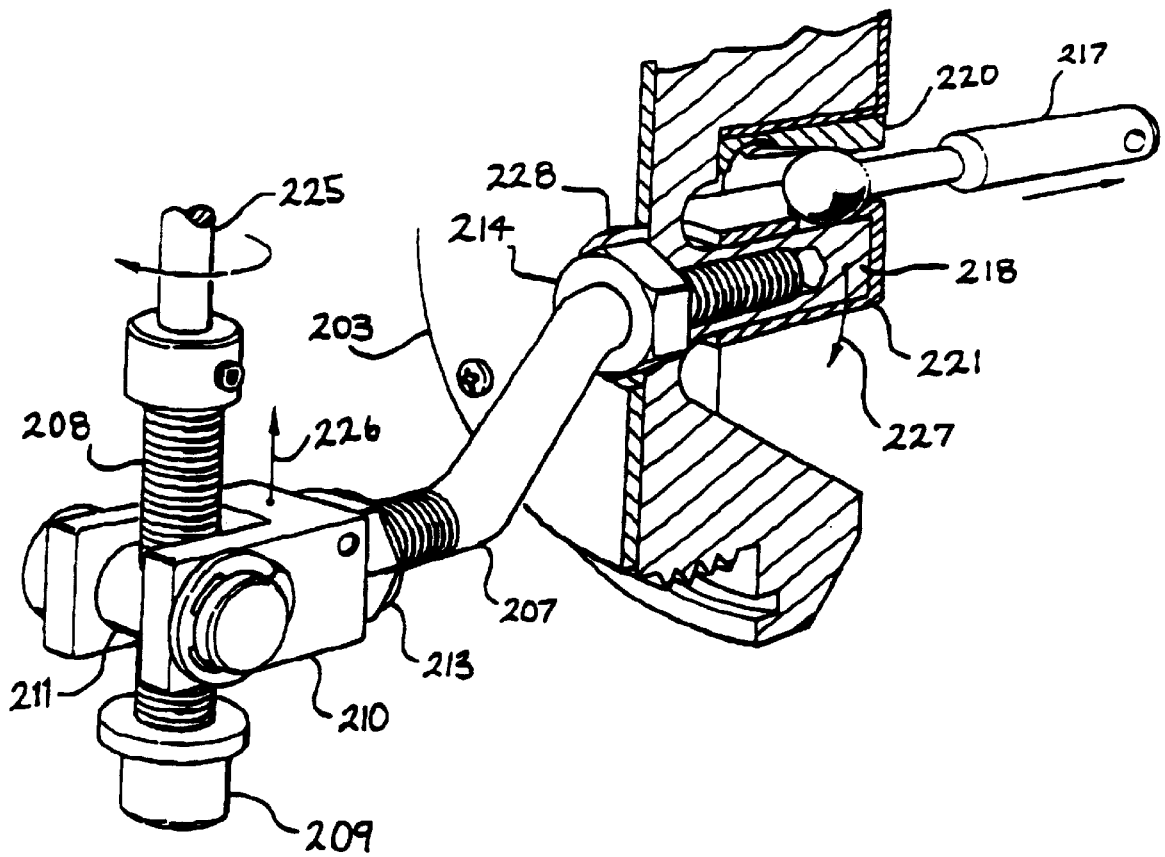
FIG. 13 is a perspective view depicting operation of the embodiment of FIGS. 12A and 12B.

As best seen from FIG. 13, the drive screw 208 connects to a gear shaft 225 extending from the motor and gearbox 205. As the drive screw 208 rotates as shown, the clevis 210 will be moved in the direction shown by the arrow 226 to thus impart a bending moment upon the lever arm 207 to cause the moveable jaw 218 to move in the direction indicated by the arrow 227 to open the jaws 218 and 219. Reverse rotation of the drive screw 208 will act to close the jaws 218, 219.

Returning to FIG. 12A, the chassis assembly 202 includes a microswitch mounting bracket 206 upon which a pair of microswitchies (not illustrated for the purposes of clarity, but known to those skilled in the art) can be mounted. The microswitchies are positioned towards the extremities of movement of the clevis 210 to respectively define open and closed positions for the jaws. Thus, by sensing the state of each of the microswitches, a control system can identify the state of the jaws and operation of release mechanism 200 and also know when to cease energisation of the motor 205 at the completion of either opening or closing.

Figure 14:
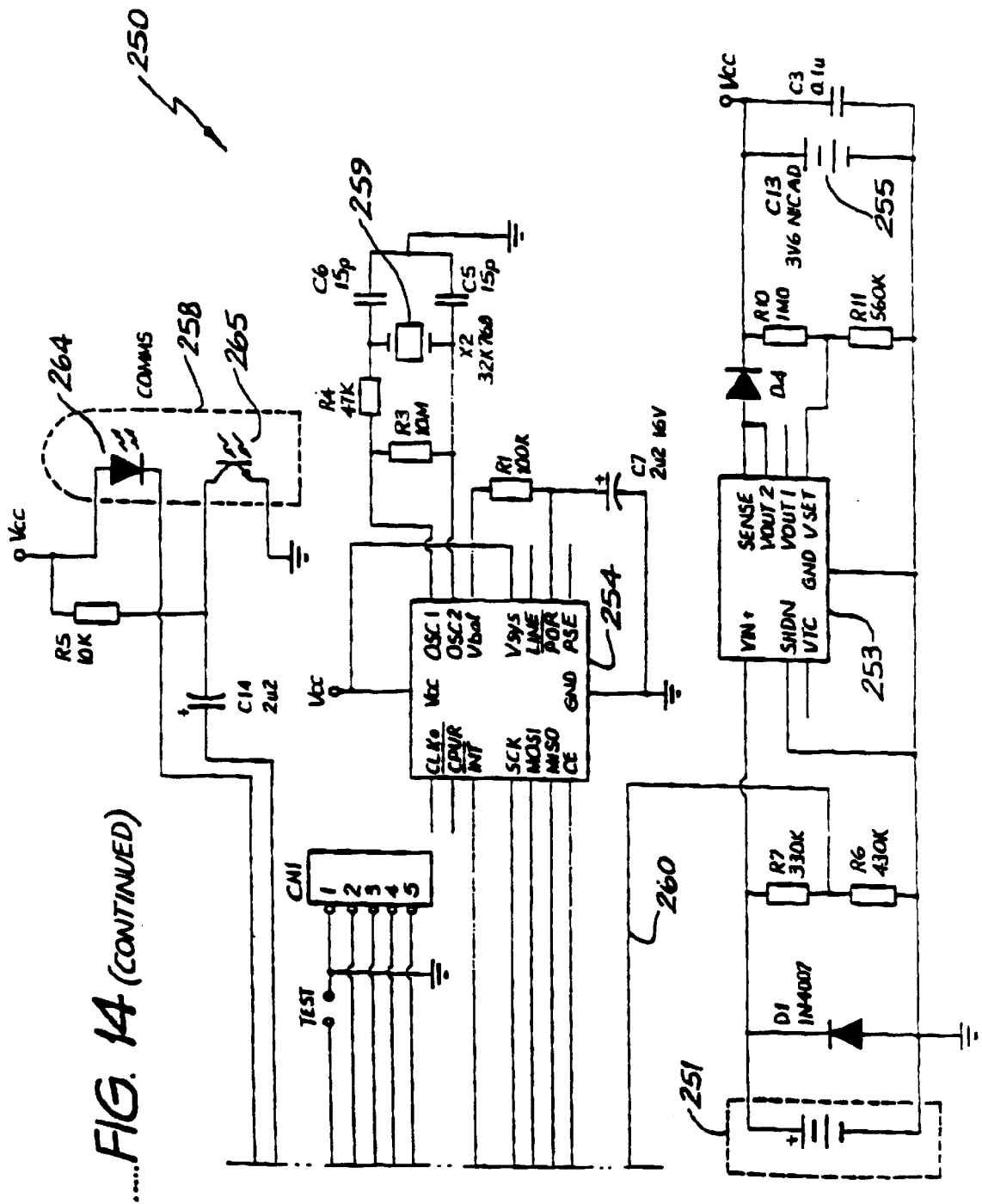
FIG. 14 is a schematic electronic circuit diagram of a control system for use with the embodiment of FIGS. 12A to 13.

Turning now to FIG. 14, a control system 250 is shown which may be used for the operation of the release mechanism assembly 200 of FIGS. 12A–13. The control system 250 is powered from a battery pack 251 preferably formed using a pack of four "D" sized heavy duty alkaline cells thus affording long life and an input supply voltage of nominally 6.0 volts. The battery pack 251 is used to drive the electric motor 205 both forward and reverse in an unregulated fashion via a pair of double pole-double throw relays 256 and 267 connected as illustrated.

The control system 250 includes a dual mode programmable micropower voltage regulator 253 preferably implemented using a MAX663ACPA device which regulates the input voltage from 6.0 volts down to 3.6 volts DC which trickle charges nickel cadmium re-chargeable battery 255. The battery 255 then supplies power to the remaining electronic circuitry of the control system 250 which includes a microcontroller unit (MCU) 252, a real-time clock 254 and infra-red communications devices 258.

The MCU 252 is preferably implemented by a HCMOS microcontroller unit device such as the ST6225F1 device manufactured by SGS Thomson Microelectronics. Such a device incorporates three peripheral ports, an 8-bit analog-to-digital converter together with an on-board oscillator, 3878 bytes of user program memory, a digital watchdog and a timer. A voltage output from the main battery pack 251 is sampled using two resistors R6 and R7 and input to the analog-to-digital converter of the MCU 252 for sensing and monitoring the main battery voltage.

A real-time clock (RTC) 254 is also provided which is preferably implemented using a CDP68HC68T1E device manufactured by Harris Semiconductor Corporation which offers full clock features including seconds, minutes, hours, date, month and year. The RTC 254 is supplied using a 32 kHz crystal 259 thus minimising power consumption that would be increased using faster oscillators. The MCU 252 operates to enable the relays 256 and 257 via transistors Q1 and Q2 respectively to cause the motor 205 to operate in either forward or reverse fashion as will be understood from FIG. 14. The position of the motor 205 (corresponding to the jaws 218,219) is sensed by microswitches 261 and 262 which provide inputs to the MCU 252. A leak sensor 263.

configured within the buoy adjacent the electronic circuitry also inputs to the MCU 252 to detect the presence of moisture therein. The infra-red communications devices 258 include an intra-red transmitter diode 264 and an infra-red receive diode 265 each of which couple to the MCU 250 as illustrated.

A submersible/releasable buoy configured using, the arrangements of FIGS. 12A to 14 is preferably programmable and/or operable in concert with hand held communications terminal or a personal computer. One example of such a hand held communications terminal is the "PSION WORKABOUT HAND HELD TERMINAL" which incorporates a keypad together with a screen having 12 lines each of 29 characters. Such a terminal provides for bi-directional infra-red communications with the communication is module 258 via the window 224. Normally, the MCU 252 sits in a "sleep mode" until it is woken via a maskable interrupt from one of three sources, those being a user attempting communications, an alarm output from the real-time clock 254 or the leak sensors 263. Operation of a buoy incorporating the components of FIGS. 12A to 14 is best understood with reference to the computer program flow charts of FIGS. 15 to 19 which identify the operation of the hand held terminal (or personal computer) and the buoy. The programs are stored in the MCU 252 and in the terminal and interact in the manner described below.

When configured for communication between the buoy and the hand held terminal, once "woken" by the user, a "wake mode" is entered by the buoy. A password entry, product banner and option menu are then displayed. The user can then select from one of "time/date setting", jaw operation and a return to the sleep modle. With no user input after a preset period of time, the control system 250 returns to a sleep mode. Two exceptions however can occur. First, there is no automatic return to the sleep mode during (but not before) entry of time/date information and also when waiting for a response to yes/no prompts.

Also, when jaw operation is selected, confirmation (yes/no) is requested for safety reasons to ensure jaw operation will not damage persons or equipment. A reading of the voltage of the battery 251 is taken, the motor 205 is then turned on and after 0.5 seconds, another battery voltage is taken with the battery under full load. These two voltages are then able to the printed or displayed upon the detection of open and closure.

The real-time clock interrupts at least once each day at a time last programmed by the user as a release event date/time. Upon doing so, the MCU 250 enters the "wake mode" whereupon a check of the battery voltage is made. If the battery voltage is found to be too low, an attempt to release is made. Also, the MCU 252 checks if the current date is the same as that of the release event date as programmed by the user. If not, the MCU 252 returns to "sleep mode". If the dates are the same, the laws are opened, thus effecting a buoy release followed by a return to sleep mode. The same voltage information is also printed (transferred) from the communication port, but without any yes/no confirmation.

The leak detector 263 comprises three electrodes arranged in parallel which sit physically close to the chassis assembly 202 which is connected to zero volts. The signal output from the detectors 263 is input to the MCU 252 on a pin programmed with a logic input with interrupt with an internal pullup resistor. Sea water that leaks in to the buoy will complete the circuit to zero volts, thus pulling the logic input low causing an interrupt. An emergency release event follows.

Figure 15:
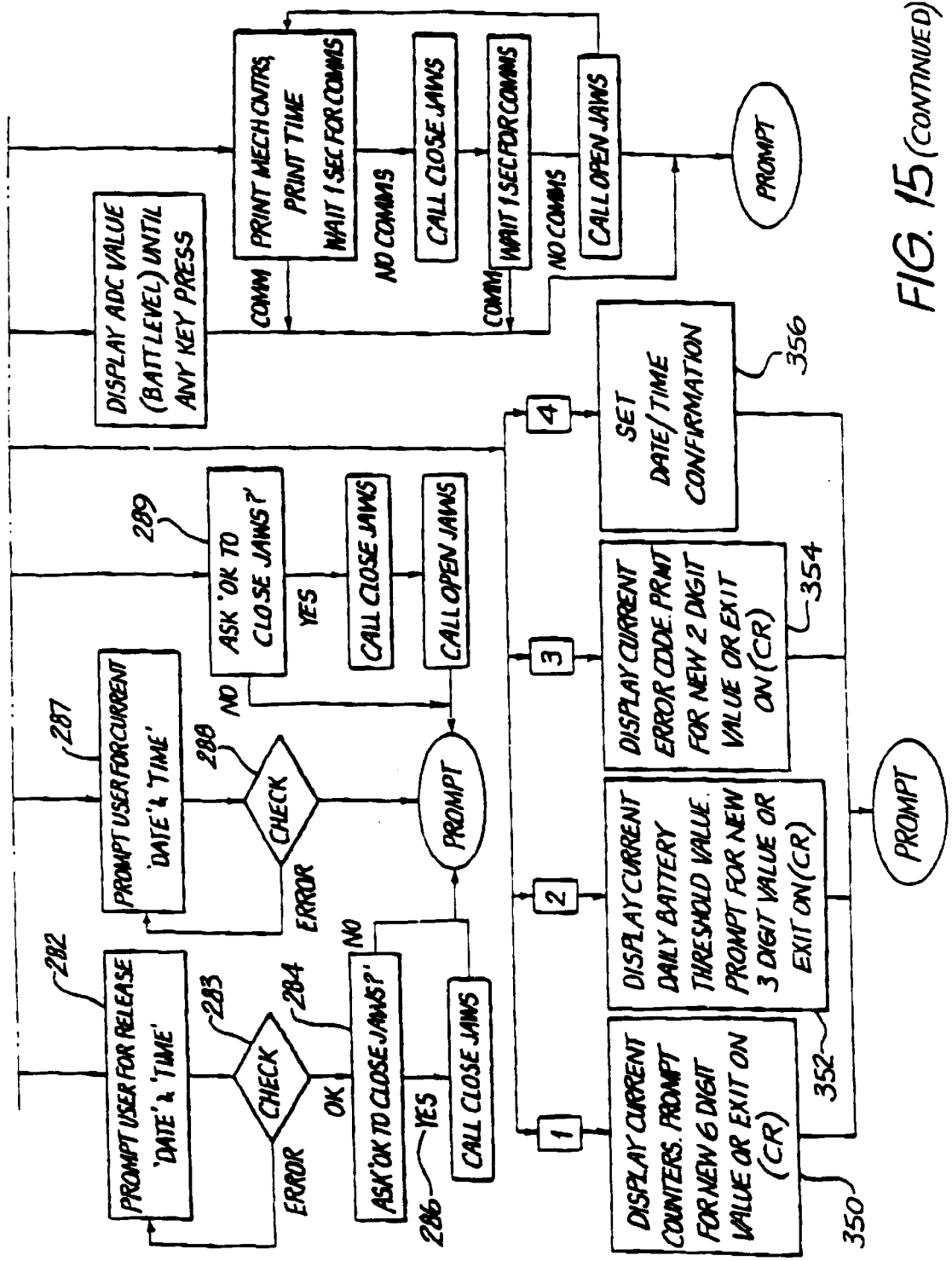

Turning now to FIG. 15, a flow chart of operation of a system incorporating a buoy and a hand held portable terminal is shown whereby the controller includes a display as described and data entry keys incorporating the following:

–0, Enter, 1, 2, 3, 4, 9, S and C.

A buoy constructed in accordance with the preferred embodiment does not incorporate an on/off switch. Instead, the buoy is intended to spend most of its serviceable life in a "sleep" mode. When asleep, the buoy consumes very little power and thus allows for long battery life. The buoy may be woken from the sleep mode in one of three ways:

by a user wanting to program a date/time information;

when an actual release event is about to take place; and when a leak is detected.

After any wake period, the sleep mode is re-entered automatically after a predetermined period of inaction. In this fashion, both the MPU 252 and the hand held terminal are provided with program code which enable such modes of operation and inactive communication therebetween. In order to commence communications, an infra-red receiver/transmitter coupled to the hand held terminal is mounted upon the end cap 201 adjacent the window 224 and the Enter key pressed twice. The serial number of the buoy is then displayed and a prompt issued for a password to be entered. This series is seen in FIG. 15 encompassing steps 280. On entry of a valid password, a display banner and menu is shown to the user at step 281. The menu presents four options numbered accordingly:

1. program release event,
2. set buoy clock,
3. test jaws,
4. go to sleep.

The programming of a release event corresponds to the time and date in the future when it is desired for the buoy to release from its tether and float to the surface for retrieval. During such a programming stage, the return to sleep mode is disabled. Initially, the release date is entered in terms of day, month and year. Once the release date is set, the release time may be set in 24 hour format. Once the date and time are set, these are returned to the user on the display so that they may be checked and noted elsewhere. This is important because the control system 250 does not incorporate a means by which the release date and time may be interrogated and as such, once the device is programmed, it is not possible, through ordinary operation, to retrieve the programmed release event date and time. At step 284, the user is asked if it is "OK to close jaws" and if not, the user is turned to the main prompt 285. If the user selects to close the jaws at step 286, the jaws are closed, which can take anything up to 30 seconds due to the high ratio of gearing being used. Once the jaws are closed and the rope shackle pin secured therebetween, the buoy may be deployed with the control system 250 returning to its sleep mode.

Selecting menu option 2 prompts the user to enter the current date and time. This step must be performed prior to a release date and time event being programmed. Such an operation is seen in FIG. 15 at steps 287 and 288.

Figure 18:
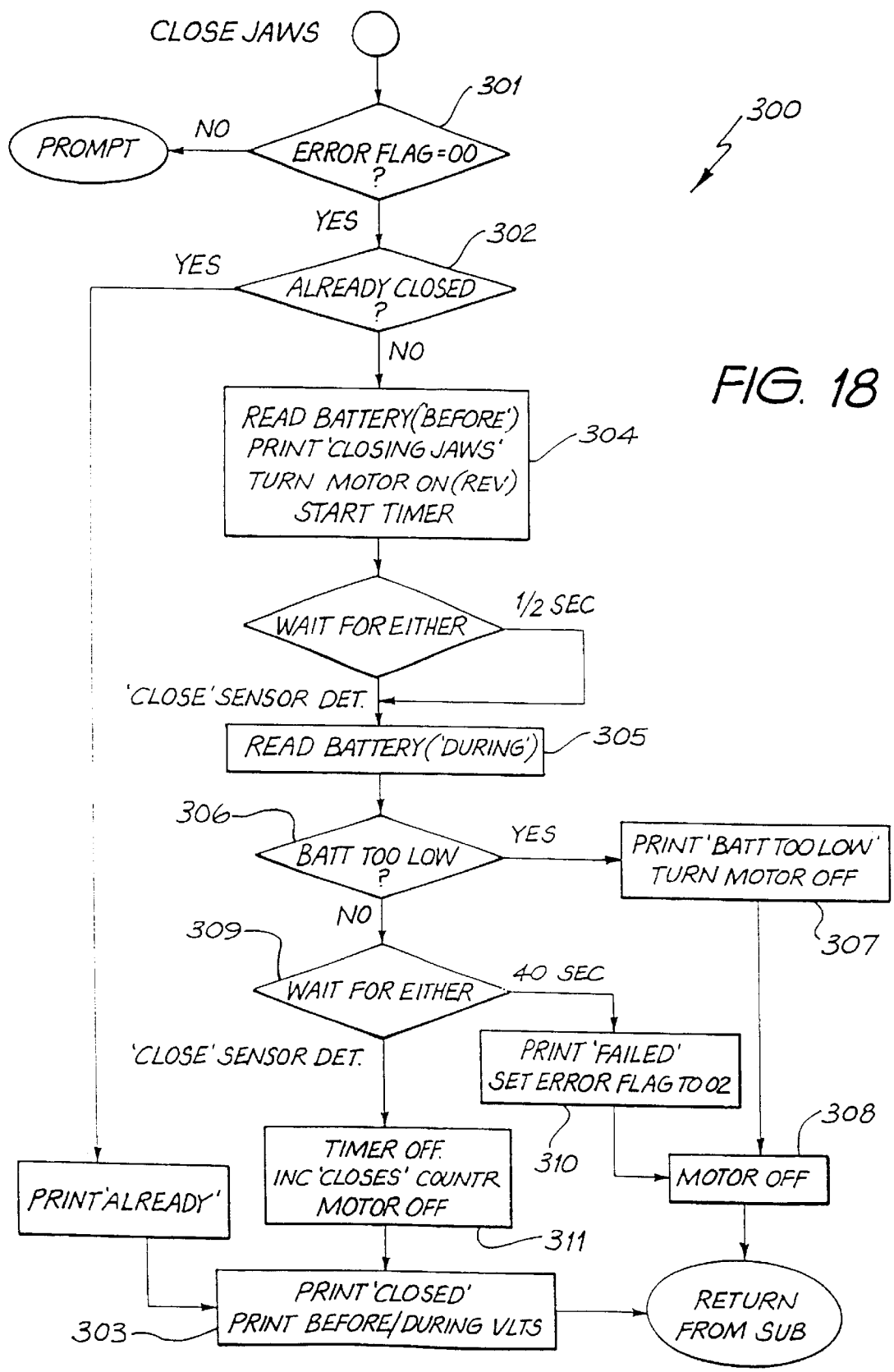

Menu option 3 provides for a test operation of the jaws as seen at steps 289 where the jaws are initially asked to be closed and if a yes is returned, a closed jaw program is operated (as seen in FIG. 18) after which immediately an open jaws operation (seen in FIG. 19) occurs.

During each opening and closing of the jaws, the battery voltage is displayed at the commencement of operations and during the operation. This provides an indication of the no load voltage on the battery 251 and the fully loaded voltage on the battery 251 thus giving the user an indication as to the expected life time of the battery 251 under normal operating conditions. Through the user selecting numeral 4 (step 290) returns the buoy to sleep mode 291.

Turning now to FIG. 18, the close jaws routine 300 is shown which initially commences with a check 301 of a error flag to determine if the closure of the jaws has been masked. If the error flag is invalid, a test is then made as to whether the jaws are already closed at step 302. If the jaws are already closed, a display of this state is then made and the voltages displayed at step 303. If the jaws are not closed, the battery voltage is read and displayed at step 304 at which time the motor 205 is turned on and a timer started. Typically, after a period of one half of a second, the battery voltage is read to give the "during" operation battery voltage at step 305. This is also detected in the alternative where the closed sensor 262 is detected. If the battery voltage is too low, detected at step 306, the corresponding display is made and the motor is turned off at steps 307 and 308. If the battery voltage is within predetermined limits, the program 300 waits for either a period of 40 seconds or for a closed sensor 262 to detect the closure of the jaws. This is seen at step 309. If the closure time is out, a failure signal is provided at step 310 and the motor 205 switched off at step 308 as indicated. Alternatively, the timer is disabled and tie motor disabled indicating that the closed sensor 262 has detected such a condition at step 311. Step 311 also increments a counter to record the number of operations of the jaws.

Figure 19:
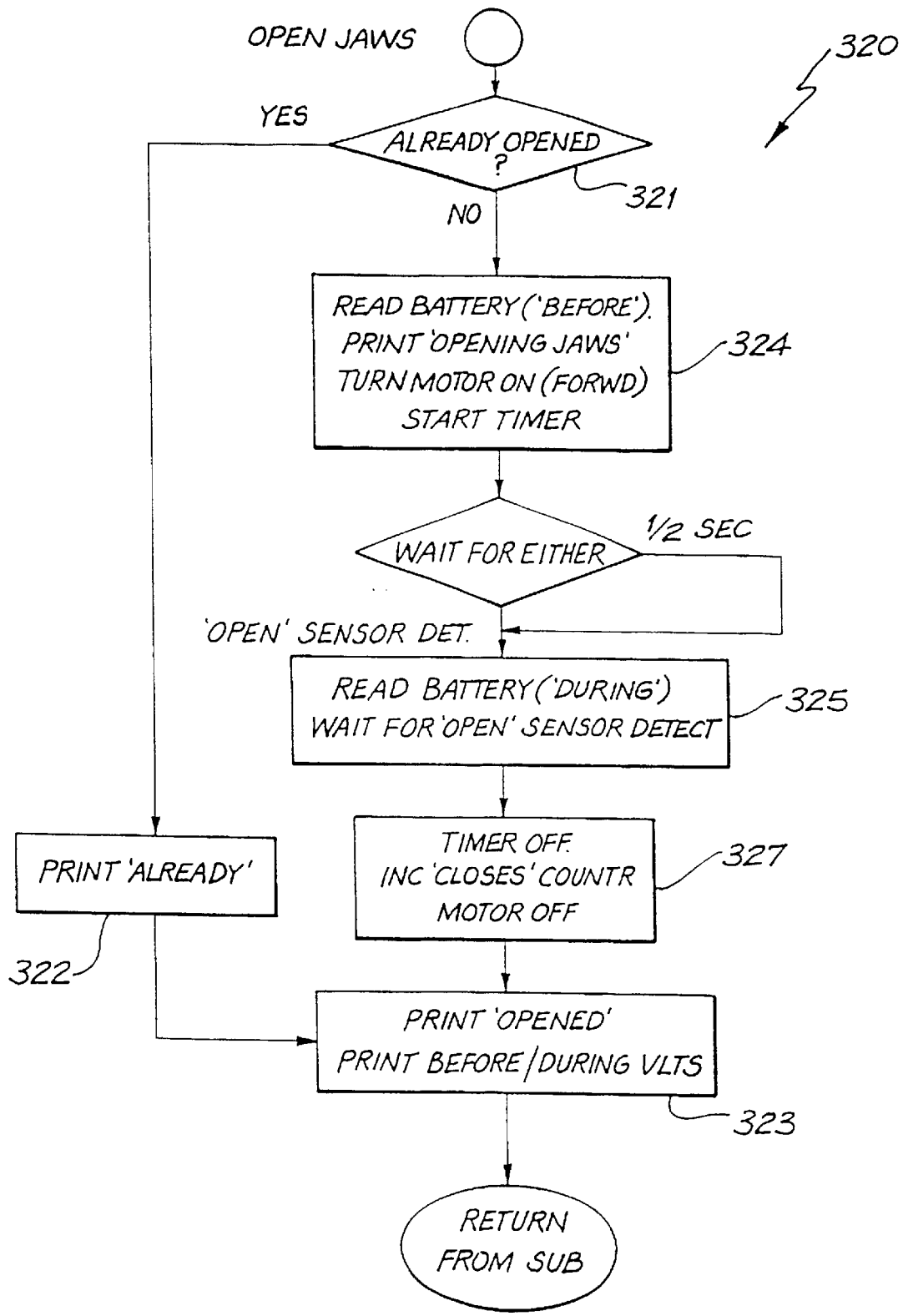

As seen in FIG. 19, program 320 indicates the procedure for opening the laws, commencing with step 321 which detects whether or not the jaws are already opened using, the opened sensor 261. If this is the case, such is printed using step 322 and step 323. If not, the battery voltage 4 is read and the motor 205 turned on to enable the opening of the jaws and the timer started at step 324. Again, after one half of a second, the battery voltage is read to display the battery voltage during operation as seen at step 325. Such also occurs if the open sensor 261 is detected. The program then waits for the open sensor 261 to detect the open configuration at which time the timer is disabled and the motor 205 is turned off at step 327. Step 327 also increments the aforementioned counter to record the number of jaw operations. The printing of the opened message and of the battery voltages before and during are then displayed at step 323.

FIG. 16 shows a program 330 for a clock interrupt which operates for both normal release event operation and also for an emergency operation. As noted earlier, the clock interrupt occurs each day at the time of day the release event was programmed. For example, if programmed at 8 am on Jun. 1, 1998 for a release at 4 pm on Jun. 10, 1998, the clock interrupt will occur at 4 pm each day (ie. ten times) up to and including Jun. 10, 1998. The procedure commences at step 331 which checks the voltage condition on the battery 251. If this is detected as being too low at step 332, an error flag is set and the jaws are opened at step 333 using the open jaws procedure of FIG. 19 described above. The device then returns to a sleep mode at step 334. If the battery voltage is within useful limited (ie. OK), the date and time is then displayed (where connected to the hand held controller) and a determination made as to whether or not the actual day is the "release day" at step 335. If not, a return to sleep mode is implemented at step 334 but if such is the release day, the open jaws procedure of FIG. 19 is called at step 336.

FIG. 17 shows procedure 340 for operation in the presence of a leak. On detection of a leak, at step 341, a check is made at step 342 as to whether or not a wake-by-leak flag has been disabled, as may be the case during servicing. If so, the buoy returns to the sleep mode at step 343. If not, the open jaws routine is called at step 334 to bring the buoy immediately to the surface.

Returning to FIG. 15, the program includes a number of hidden menu options, the first being menu option 91 seen at step 350 which resets an actuation counter that counts the number of times the jaws have been actuated. Menu option 92 shown at step 352 displays a daily battery threshold which might be required in extreme environmental and deployment conditions such as very cold or very warm water. Menu option 93 shown at step 354 resets any error flags on the program, whereas menu item 94 shown at step 356 determines whether a second confirmation of the date and time required for a release event is necessary.

The buoys and release mechanisms described above have a multitude of uses and applications. For example, oyster, scallop and mussel farms are traditional located in tidal areas so that when the tide recedes, the catch can be collected and the farms can be maintained. Alternatively, a long-line method of farming can be used where trays are hung from surface buoys. Both of these methods can have a detrimental effect on the environment, including loss of recreational area for the public. visual pollution, noise pollution and hazards being created for swimmers and other water users (marine vessels, etc). The described buoys can enable the farm to be located underwater. Importantly, when harvest or inspection is required, the buoys can be programmed or instructed to simultaneously release to bring to the surface the farming bed. Such an arrangement is advantageous because it permits relocating the farm away from the shore and bays that would otherwise attract recreation user, eliminate the need to locate farms in calm waters, lessen dangers of boating accidents, allow for larger, more cost efficient farms, improve security, and allow fish stocks to be located in different temperatures for control of growth. Similar arrangements can be used for abalone and fish farming, and spat collecting.

In maritime operations, permanent moorings are often used where wharf space is not assailable. Such moorings often become a hazard by the requirement of a surface buoy. Embodiments of the present invention can allow moorings to be submersed until such time as they are required, whereupon the buoy can be brought to the surface together with a tether line or chain with which a mooring or anchorage call be established. Such a method could also be used by small craft.

There have been cases where ships have been lost or damaged due to the failure of the anchor or poor selection of an anchorage. Various embodiments of the present invention can be implemented in an underwater light system, or sonar to guide ships to their destination.

One specific application for the described buoys is in the oil industry. In particular, an array of buoys can be established about an oil terminal to be operable in the event of an oil leak or spill. Strung between the normally submersed buoys can be a (submersed) boom useful in preventing the spread of oil across the water surface. In the event of a spill, the buoys can be released from fixed anchorages on the harbour floor to raise the boom to the surface. Thus, the boom can be immediately and essentially automatically deployed by the transmission of an appropriate release signal, for example an underwater acoustic wave signal described above. Such an arrangement can achieve deployment many times faster than current manual methods.

Where enviromental monitoring is required, equipment is often required to be left in place for periods of time in lakes, rivers and dams. Generally to retrieve the equipment, a surface buoy is required. However, this can permit unauthiorised access to equipment sometimes worth hundreds of thousands of dollars. Information can be distorted and months or years of work lost. Surface buoys have also been used for shooting target practice and this can also restrict a research program. Further, surface buoys on lakes and rivers become a hazard to boats. The buoys described above permit monitoring equipment and payloads to be safely and retrievably located.

Because the described buoys are computer controlled, generally each buoy, or a groups of buoys are provided with an identification code so that remote programming and release is selective and does not apply to all buoys that may detect a signal. The described embodiments can also be modified to collect data about a number of times the buoy has been submersed and subsequently retrieved. This data can then be used to police a quota system for fisherman. This can help to reduce overfishing, and where a real-time clock is used, fishing out of season, deployment at inappropriate times (eg. night time) and the like.

Various embodiments of the present invention can be provided for sale only to licensed users in a particular industry and so a licensing and monitoring system can be established. Government authorities can hold specific information on the buoy serial numbers, source codes, etc. and a user could thus supply the controller 42 for interrogation by those authorities.

Use of microprocessor control permits the described buoys to be programmed to operate during a specific season (eg. the cray fishing season) only. For example, such control can be extended to disable release operation, setting or resetting of the buoy after sunset and before sunrise, thereby reducing illegal fishing activities during nightime.

Currently, authorities can incur large costs searching oceans for surface buoys attached to crab pots and other payloads. Surface buoys need to be lifted to be checked, then redeployed. If a crab pot is found to be illegal, then the authority must wait for the fisherman to return and lift the equipment before prosecuting the fisherman. This makes apprehension difficult.

Using an embodiment of the present invention, where the buoy system is supplemented to include a GPS satellite positioning device in the remote controller 42, authorities can interrogate the controller 42 to retrieve the position and time at which the buoy is due to surface. Authorities can be present at the location of the equipment at the due time of retrieval when the fisherman would be there to retrieve the equipment to carry out any desired inspections. There is no need for authorities to locate or handle the equipment.

At the conclusion of the fishing season, all of the controllers 42 in that particular industry (eg. crayfish) could be interrogated and the information loaded into a computer. This information can include time, dates, and Global Positioninig System (GPS) positions where each buoy was deployed and could substantially improve management of the particular industry. The buoys themselves can also be modified to include GPS devices and in some applications, satellite transmitters configured to relay position and time of deployment.

It will be apparent from the foregoing that a number of arrangements have been described which permit operative and controlled release of a submersible buoy. In particular, the use of gearing and motor control prevents inadvertent release of the actuating mechanisms and thus affords more reliable operation.

The foregoing describes only a number of embodiments of the present invention and modifications, obvious to those skilled in the art, can be made thereto without departing from the scope of the present invention. For instance, the two jaw version shown in FIGS. 9 and 10 could be incorporated into a machined plastic end cap as described for the embodiment of FIGS. 1B, 4, 5A, 5B and 6, thus obviating the need for the resiliently flexible sealants described with the embodiment of FIGS. 9 and 10. Further, the release mechanism need not be used in a submersible buoy but, for example, could be located in a fixed structure (eg. on the ocean floor) and configured to release a payload connected to the shackle pin.

What is claimed is:

1. A releasable retaining apparatus comprising:
   (i) a body having at least two jaws, the jaws being configured to releasably retain a member;
   (ii) displacing means separated from said member by a hermetic seal formed on said body to confine said displacing means substantially within said body, said displacing means being operable to move at least one of said jaws to release or retain said member;
   wherein at least one jaw forms at least a part of said hermetic seal.

2. An apparatus according to claim 1, wherein said hermetic seal further comprises a static sealing member located substantially adjacent a part of said body at which said hermetic seal is intended to be completed and/or disrupted.

3. An apparatus according to claim 2, wherein said static sealing member comprises an O-ring.

4. An apparatus according to claim 1, wherein at least part of said hermetic seal is formed from a resiliently deformable material.

5. An apparatus according to claim 4, wherein said part of said hermetic seal formed from a resiliently deformable material comprises a piece that has integrally formed therein at least one of said jaws, said one jaw being connected to said displacing means so as to be biased away from the other said jaw to release said member from therebetween.

6. An apparatus according to claim 5, wherein said other jaw is integrally formed in said piece to form part of said hermetic seal.

7. An apparatus according to claim 6, wherein one jaw comprises a post-like structure extending from a relatively thin section of said piece, and said other jaw comprises a relatively thick section of said piece adjacent said jaw.

8. An apparatus according to claim 5, wherein said piece is configured to close an opening in said body and further comprising a static sealing member configured about at least a periphery of said piece.

9. An apparatus according to claim 8, wherein said static sealing member comprises an O-ring.

10. An apparatus according to claim 5, wherein one jaw comprises a post-like structure extending from a relatively thin section of said piece, and said other jaw comprises a complementary post-like structure adjacent said jaw.

11. An apparatus according to claim 4, wherein said body is hermetically sealed by a combination of a piece through which at least one jaw extends to be moveable by said displacing means, a static seal arranged at a connection between said piece and said body, and a resiliently deformable seal formed about said one jaw adjacent said piece.

12. An apparatus according to claim 11, wherein said piece is substantially solid and rigid.

13. An apparatus according to claim 1, wherein said member is substantially elongate and comprises an end configured to be engaged between and held by said jaws.

14. An apparatus according to claim 13, wherein said end comprises a ball integrally formed on a pin locatable between said jaws.

15. An apparatus according to claim 13, wherein a surface of at least one of said jaws comprises a metallic strengthening portion arranged to abut said end of said member.

16. An apparatus according to claim 1, wherein said displacing means comprises an electric motor and a gearing arrangement configured to bias one jaw away from the other jaw.

17. An apparatus according to claim 16, wherein said displacing means further comprises a transfer means coupled to said gearing arrangement and configured to convert a rotational force generated by said motor via said gearing arrangement into a bending force and to transfer said bending force to bias one jaw toward or away from the other jaw.

18. An apparatus according to claim 17, wherein said transfer means comprises an arm having a first end coupled to one jaw and a second end coupled to said gearing arrangement for eccentric movement, said eccentric movement creating a virtual pivot point about which one jaw moves.

19. An apparatus according to claim 18, wherein said first end of said arm is at least embedded within said jaw.

20. An apparatus according to claim 17, wherein said transfer means comprises a drive screw extending from said gearing arrangement and upon which a drive nut is configured for longitudinal movement along said drive screw dependent on a rotation of said drive screw, and an arm depending from said drive nut and coupled to one jaw.

21. An apparatus according to claim 20, wherein said arm extends substantially perpendicularly from said drive screw and movement of said drive nut along said drive screw imparts a bending moment upon said arm, said moment being transferred to one jaw via a virtual pivot point formed at a connection between said arm and one jaw.

22. An apparatus according to claim 17, wherein said transfer means comprises a drive screw upon which is configured a drive block for movement along said drive screw, said drive block including opposed apertures arranged either side of said drive screw and through each of which an arm passes, each said arm being coupled to a respective one of said jaws to bias said jaws toward and away from each other as a result of rotation of said drive screw.

23. An apparatus according to claim 16, further comprising a battery power source and means for assessing an operational voltage of said battery power source, said means for assessing being configured to cause actuation of said displacing means to open said jaws and release said member when a predetermined low battery voltage state is identified.

24. An apparatus according to claim 1, wherein said displacing means is configured to move said jaws both away from and towards each other to release and retain said member.

25. An apparatus according to claim 1, wherein said member is operably connected to a point, whereby release of said member from said jaws permits relative movement between said body and said point.

26. An apparatus according to claim 25, wherein said point is one of a payload or a fixed location.

27. An apparatus according to claim 1, wherein said displacing means is operable upon receipt of a signal.

28. An apparatus according to claim 27, wherein said signal is a remotely transmitted and received signal, said apparatus further including a receiver for receiving said signal and for actuating said displacing means.

29. An apparatus according to claim 27, wherein said signal is a timer signal generated by a timer means to cause actuation of said displacing means at a predetermined time.

30. An apparatus according to claim 29, further comprising communication means configured to permit setting of said predetermined time within said timer means.

31. A submersible and retrievable buoy comprising:
(i) a spool-shaped body about which can be wound a length of line, said line having a first end, a medial portion and second end affixed to said body;
(ii) a hermetic seal defining a hermetically sealed space associated with said body and within which is located an actuator;
(iii) a member releasable from said body and to which said medial portion of said line can be attached; and
(iv) a clamping mechanism having a moveable clamping part, said mechanism operable by said actuator to release and or retain said member,
wherein said moveable clamping part of said mechanism comprises at least a part of said hermetic seal.

32. A buoy according to claim 31, wherein said hermetic seal comprises a cap, and further comprising a static seal at a connection between said cap and said body, wherein said clamping mechanism is integrally formed within said cap.

33. A buoy according to claim 32, wherein said clamping mechanism is machined to form a first jaw and a second jaw, between which is locatable said member to be releasably retained by said jaws, wherein said first jaw comprises said moveable clamping part, said first jaw being connected to said actuator to move relative to the said second jaw.

34. A buoy according to claim 33, wherein said second jaw is also moveable relative to said first jaw.

35. A buoy according to claim 33, further comprising a motor connected to a gear mechanism, wherein said actuator comprises a rod connecting said first jaw and said gear mechanism such that activation of said motor can effect movement of said jaw to grasp or release said member.

36. A buoy according to claim 33, wherein said cap is solid and substantially inflexible, and the machining of said cap creates a relatively thin section adjacent at least one of said integrally formed jaws, permitting said jaw to be resiliently flexible.

37. A submersible and retrievable buoy system for use in a body of water, said system comprising:
(i) a transmitting device configured to transmit a signal including information;
(ii) a buoy according to claim 31, said buoy further comprising a means for receiving said signal and causing operation of said actuator in accordance with said information; and
(iii) a payload to which said first end of said line is attached.

38. A submersible and retrievable buoy system of claim 37, wherein said hermetic seal comprises a cap, and further comprising a static seal at a connection between said cap and said body, wherein said clamping mechanism is integrally formed within said cap.

39. A submersible and retrievable buoy system according to claim 38, wherein said clamping mechanism is machined to form a first jaw and a second jaw, between which is locatable said member to be releasably retained by said jaws, wherein said first jaw comprises said moveable clamping part, said first jaw being connected to said actuator to move relative to the said second jaw.

40. A submersible and retrievable buoy system according to claim 39, wherein said second jaw is also moveable relative to said first jaw.

41. A submersible and retrievable buoy system according to claim 39, further comprising a motor connected to a gear mechanism, wherein said actuator comprises a rod connecting said first jaw and said gear mechanism such that activation of said motor can effect movement of said jaw to grasp or release said member.

42. A submersible and retrievable buoy system according to claim 39, wherein said cap is solid and substantially inflexible, and the machining of said cap creates a relatively thin section adjacent at least one of said integrally formed jaws, permitting said jaw to be resiliently flexible.

43. A submersible and retrievable buoy system according to claim 37, wherein said buoy is positively buoyant and said payload is negatively buoyant, and of greater magnitude than that of said buoy.

44. A submersible and retrievable buoy system according to claim 37, wherein said means comprises a signal receiver and a control unit connected to said actuator, whereby said signal receiver is arranged to receive the signal transmitted by said transmitter and to convey said information to said control unit, and said control unit is configured to interpret said information and to cause operation of said actuator in accordance therewith.

45. A submersible and retrievable buoy system according to claim 44, wherein said signal is coded for reception by a selected buoy and said information comprises timing information for determining a mode of operation of said buoy by controlled operation of said actuator.

46. A submersible and retrievable buoy system according to claim 45, wherein said timing information comprises real-time data and said control unit comprises a real-time clock, whereby said control unit is operable to monitor said real-time clock to cause operation of said actuator when said real-time data is valid.

47. A submersible and retrievable buoy system according to claim 44, wherein said signal receiver is selected from the group consisting of an infra-red receiver and an acoustic wave receiver.

48. A submersible and retrievable buoy system according to claim 47, wherein said signal receiver comprises an infra-red receiver, said buoy further comprising an infra-red signal transmitter arranged to transmit information regarding the programming and or use of said buoy.

49. A submersible and retrievable buoy system according to claim 38, wherein said means comprises a signal receiver and a control unit connected to said actuator, whereby said signal receiver is arranged to receive the signal transmitted by said transmitter and to convey said information to said control unit, and said control unit is configured to interpret said information and to cause operation of said actuator in accordance therewith.

50. A submersible and retrievable buoy system according to claim 49, wherein said signal receiver comprises an infra-red receiver, and said infra-red receiver is positioned adjacent a thin section of said cap substantially transparent to infra-red light and forming a window for the reception of said information by said buoy.

51. A submersible and retrievable buoy system according to claim 50, wherein said cap is manufactured of UHMW polyethelene.

* * * * *